United States Patent
Turvy, Jr. et al.

(10) Patent No.: US 9,883,570 B1
(45) Date of Patent: Jan. 30, 2018

(54) PROTOCOL FOR LIGHTING CONTROL VIA A WIRELESS NETWORK

(71) Applicant: ABL IP HOLDING LLC, Conyers, GA (US)

(72) Inventors: Larry D. Turvy, Jr., Lawrenceville, GA (US); John W. Scrimgeour, Alpharetta, GA (US); Tyler B. Fultz, Atlanta, GA (US); John Peter Roquemore, III, Suwanee, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/214,962

(22) Filed: Jul. 20, 2016

(51) Int. Cl.
*H05B 37/02* (2006.01)
*G08C 17/02* (2006.01)
*H04L 12/18* (2006.01)
*H05B 33/08* (2006.01)

(52) U.S. Cl.
CPC ......... *H05B 37/0272* (2013.01); *G08C 17/02* (2013.01); *H04L 12/18* (2013.01); *H05B 33/0809* (2013.01); *H05B 33/0854* (2013.01); *H05B 37/0218* (2013.01); *H05B 37/0227* (2013.01); *H05B 37/0236* (2013.01)

(58) Field of Classification Search
CPC ............ H05B 37/0218; H05B 37/0254; H05B 37/0263; H05B 37/0272; H05B 37/0281; H05B 37/029; H05B 37/034
USPC .......................................... 315/152, 308, 312
See application file for complete search history.

(56) References Cited

U.S. PATENT DOCUMENTS

| 6,969,954 | B2 | 11/2005 | Lys | |
|---|---|---|---|---|
| 7,880,639 | B2 | 2/2011 | Courtney et al. | |
| 8,035,320 | B2 | 10/2011 | Sibert | |
| 8,674,628 | B2 * | 3/2014 | Kim ................... | H05B 37/0272 315/307 |
| 9,251,702 | B2 | 2/2016 | Geeraerts | |
| 9,253,040 | B2 | 2/2016 | Pitchers et al. | |
| 9,462,663 | B2 * | 10/2016 | Aggarwal .......... | H05B 37/0227 |
| 2008/0218087 | A1 | 9/2008 | Crouse et al. | |

(Continued)

OTHER PUBLICATIONS

IEEE 802.15.4—Wikipedia, the free encyclopedia, downloaded at https://en./wiki/IEEE_802.15.4, dated Oct. 7, 2016, 7 pages.

(Continued)

*Primary Examiner* — Tung X Le
(74) *Attorney, Agent, or Firm* — RatnerPrestia

(57) ABSTRACT

A monitor lighting control device receives a state change event message that includes a payload specifying: (i) a state change event of an occupancy, audio, or daylight sensor, or a switch to turn lighting on/off, dim up/down, set scene or the like; (ii) an identifier of a member lighting control device that detected the state change event; and (iii) a lighting control group identifier of a lighting control group that includes the member lighting control device and the monitor lighting control device. The monitor lighting control device transmits an acknowledgement of receipt of the state change event message to the member lighting control device. The monitor lighting control device generates a state change multicast message that includes the state change event of the payload. Also, the monitor lighting control device transmits the generated state change multicast message to the lighting control group.

20 Claims, 14 Drawing Sheets

(56) References Cited

U.S. PATENT DOCUMENTS

| | | | |
|---|---|---|---|
| 2009/0278479 | A1 | 11/2009 | Platner et al. |
| 2010/0327766 | A1* | 12/2010 | Recker .................. H02J 9/02 |
| | | | 315/291 |
| 2011/0112661 | A1 | 5/2011 | Jung et al. |
| 2011/0187271 | A1* | 8/2011 | Bouws .................. H05B 37/00 |
| | | | 315/130 |
| 2012/0136485 | A1 | 5/2012 | Weber |
| 2013/0285574 | A1* | 10/2013 | Garcia Morchon .......... H05B 37/0245 |
| | | | 315/297 |
| 2014/0035482 | A1* | 2/2014 | Rains, Jr. ........... H05B 37/0254 |
| | | | 315/294 |
| 2015/0359075 | A1* | 12/2015 | Keirstead ........... H05B 37/0272 |
| | | | 315/362 |
| 2016/0286629 | A1* | 9/2016 | Chen .................. H05B 37/0272 |
| 2016/0323972 | A1* | 11/2016 | Bora .................. H05B 33/0842 |

OTHER PUBLICATIONS

Silicon Labs, EFR32xG1 Wireless Gecko Reference Manual, pp. 1-12, 186-193, 968-993 and search results listing Jul. 8, 2016 date for this Manual (49 pages total).

\* cited by examiner

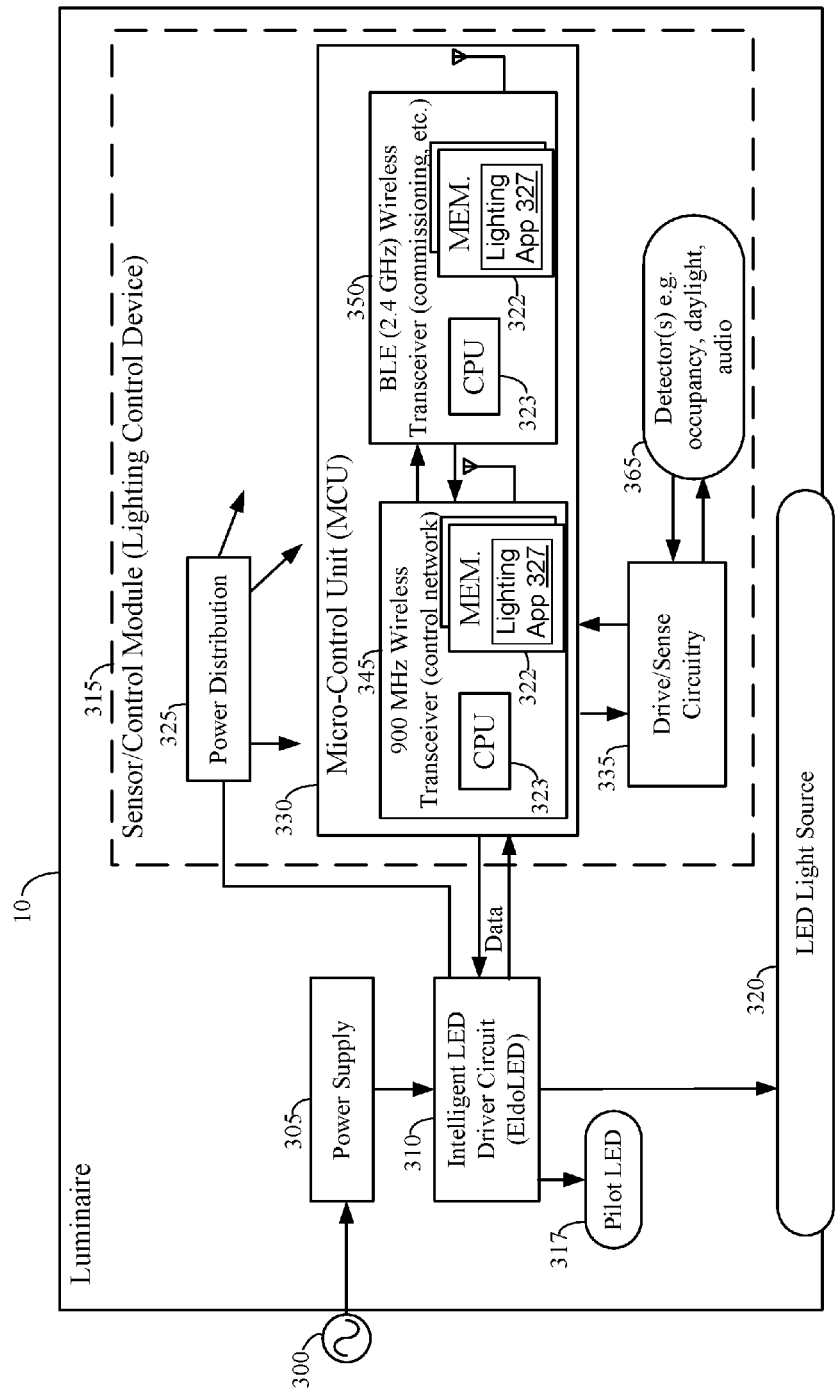

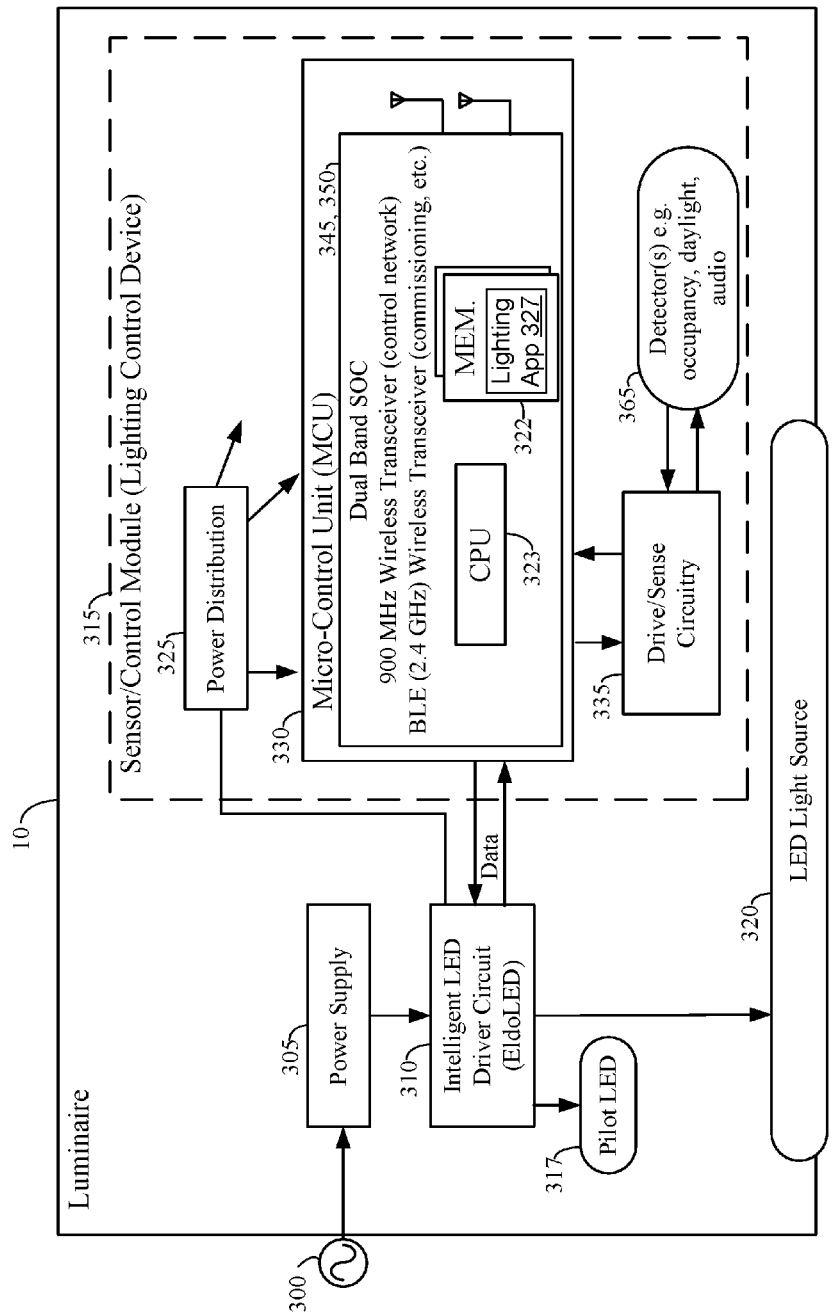

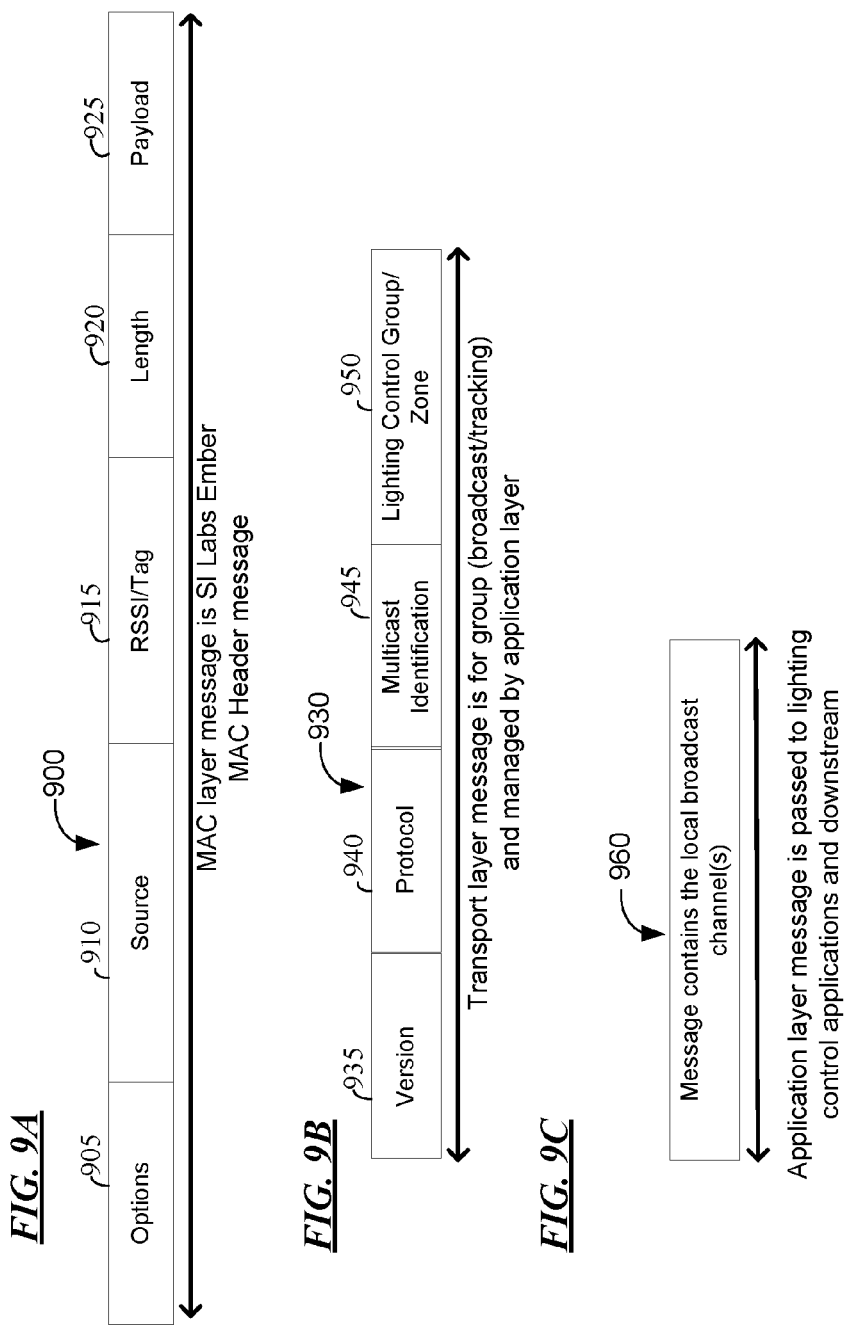

PROTOCOL FOR LIGHTING CONTROL VIA A WIRELESS NETWORK

BACKGROUND

Traditional luminaires can be turned ON and OFF, and in some cases may be dimmed, usually in response to user activation of a relatively simple input device. Often traditional luminaires are controlled individually or as relatively small groups at separate locations.

More sophisticated lighting control systems automate the operation of the luminaires throughout a building or residence based upon preset time schedules, occupancy, and/or daylight sensing. Such lighting control systems receive sensor signals at a central lighting control panel, which responds to the received signals by deciding which, if any, relays, switching devices, and/or dimming ballasts to drive in order to turn on or off and/or adjust the light levels of one or more luminaires.

More recent lighting systems are wireless; however, operating luminaires to operate over wireless communication systems using group based controls can be difficult. For example, multiple simultaneous control requests can ovewhelm a node that is tasked with managing the group. Accordingly, a system is needed to overcome these and other limitations in the art.

SUMMARY

In an example, a monitor lighting control device includes a wireless radio communication interface system configured for wireless communication over a wireless lighting control network communication band, of control and systems operations information, during control network operation over the lighting control network communication band. The monitor lighting control device further includes a processor, a memory accessible to the processor, and programming in the memory. The programming in the memory configures the processor to receive via the wireless radio communication interface a state change event message that includes a payload specifying: (i) a state change event of an occupancy, audio, or daylight sensor, or a switch to turn lighting on/off, dim up/down, or set scene, (ii) an identifier of a member lighting control device that detected the state change event, and (iii) a lighting control group identifier of a lighting control group that includes the member lighting control device and the monitor lighting control device. The programming in the memory further configures the processor to in response to receiving the state change event message, transmit via the wireless radio communication interface an acknowledgement of receipt of the state change event message to the member lighting control device. The programming in the memory further configures the processor to extract and save the payload from the state change event message and generate a state change multicast message that includes the state change event of the extracted payload. The programming in the memory further configures the processor to transmit via the wireless radio communication interface the generated state change multicast message to members of the lighting control group.

In an example, a lighting control device includes a wireless radio communication interface system configured for wireless communication over a wireless lighting control network communication band, of control and systems operations information, during illumination operation of one or more luminaires and during control network operation over the lighting control network communication band. The lighting control device further includes drive/sense circuitry to detect a state change of an occupancy, audio, or daylight sensor, or a switch to turn lighting on/off, dim up/down, or set scene and a processor coupled to the drive/sense circuitry. The lighting control device further includes a memory accessible to the processor and programming in the memory which configures the processor to detect the state change of the sensor or the switch via the drive/sense circuitry. The programming in the memory further configures the processor to in response to the detected state change event, generate a state change event message having a payload specifying the lighting control device, the state change event, and a lighting control group identifier of the lighting control group that includes the lighting control device. The programming in the memory further configures the processor to unicast via the wireless radio communication interface the generated state change event message to a group monitor of the lighting control group. The programming in the memory further configures the processor to upon failing to receive an acknowledgement of the unicasted state change event message from the group monitor within a predetermined time period, generate and multicast via the wireless radio communication interface the state change event message indicating the state change event to members of the lighting control group listening on a respective broadcast channel or an address of the lighting control group.

In an example, a luminaire includes a wireless radio communication interface system configured for wireless communication over a wireless lighting control network communication band, of control and systems operations information, during illumination operation of the luminaire and during control network operation over the lighting control network communication band. The luminaire further includes a processor, a light emitting diode (LED) light source, an LED driver circuit to drive the LED light source, a memory accessible to the processor, and programming in the memory which configures the processor to receive via the wireless radio communication interface a multicast message from a group monitor having a payload specifying: (i) a state change event of an occupancy, audio, or daylight sensor, or a switch to turn lighting on/off, dim up/down, or set scene, and (ii) a lighting control group identifier of a lighting control group. The programming in the memory further configures the processor to receive via the wireless radio communication interface a unicast message from the group monitor to confirm receipt of the multicast message and send an acknowledgement message of the unicast message via the wireless radio communication to the group monitor to confirm receipt of the multicast message. The programming in the memory further configures the processor to check the lighting control group identifier to determine whether the luminaire is a member of the lighting control group specified in the multicast message. The programming in the memory further configures the processor to upon determining that the luminaire is a member of the lighting control group, adjust illumination light output of the LED light source via the LED driver circuit in accordance with the state change event.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-C are block diagrams of luminaires that communicate via the lighting control system of FIG. 1A or FIG. 1B.

FIG. 9A is a media access control (MAC) layer message for communicating a state change event to a lighting control device on a lighting control network.

FIG. 9B is a transport layer message for communicating a state change event to a lighting control device on a lighting control network.

FIG. 9C is an application layer message for communicating a state change event to a lighting control device on a lighting control network.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1A:
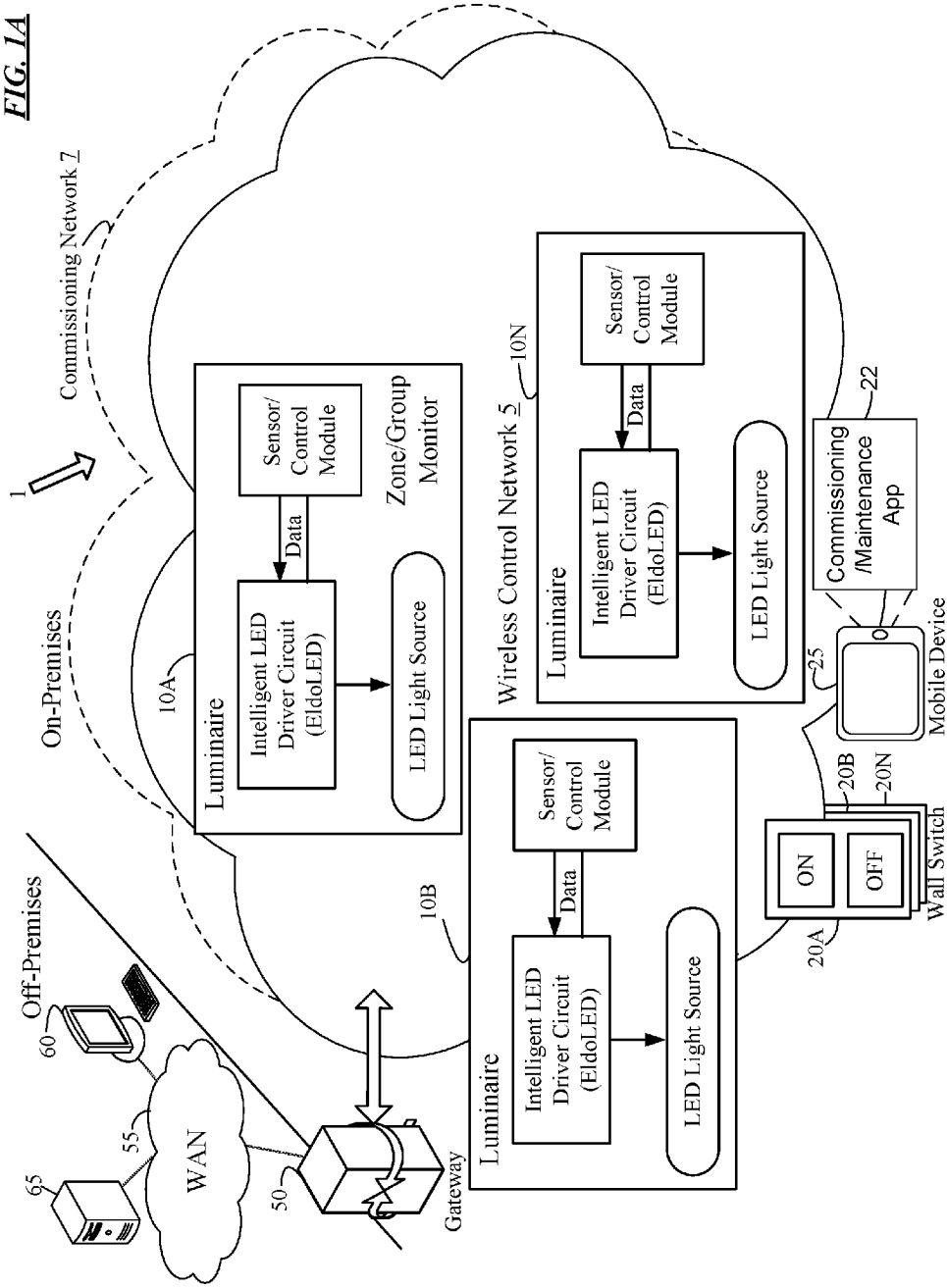
FIG. 1A is a high-level functional block diagram of an example of a system of networks and devices that provide a variety of lighting controls, including communications in support of turning lights on/off, dimming, set scene, and sensor trip events.
Figure 1B:
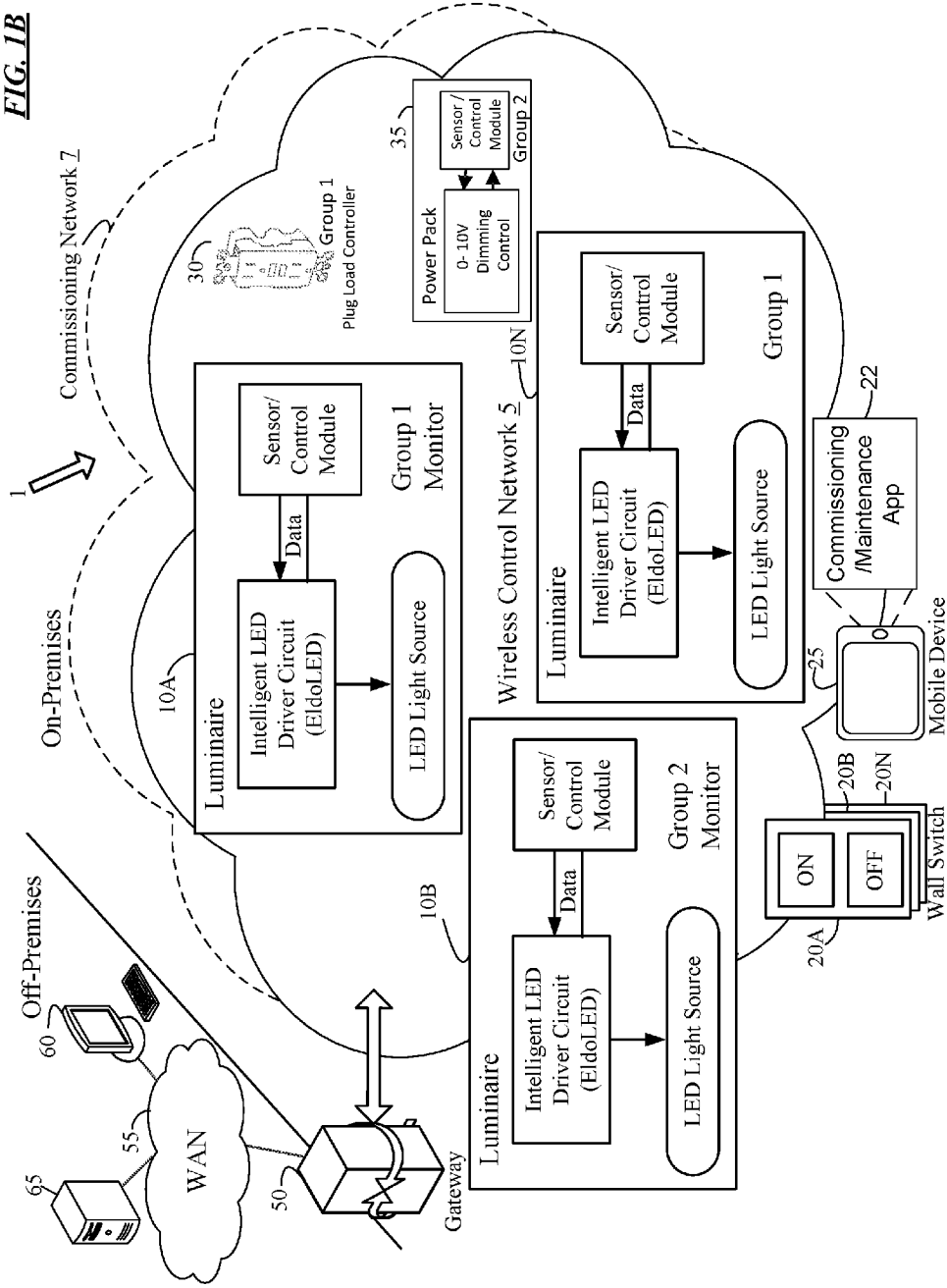
FIG. 1B is another high-level functional block diagram of an example of a system of networks and devices that further includes plug load controller and power pack devices and various lighting control groups.

Reference now is made in detail to the examples illustrated in the accompanying drawings and discussed below. FIGS. 1A-B are functional block diagrams illustrating examples, each relating to a system of networks and devices that provide a variety of lighting control capabilities, including communications in support of turning lights on/off, dimming, set scene, and sensor trip events. FIG. 1B is the same as FIG. 1A, but further includes additional lighting control devices (LCDs): a plug load controller 30 and a power pack 35; and illustrates exemplary lighting control groups. It should be understood that the term "lighting control device" means a device that includes a controller (sensor/control module or micro-control unit) as shown in FIGS. 3A-C, 4A-C, 5, and 6 that executes a lighting application for communication over a wireless lighting control network communication band, of control and systems operations information during control network operation over the lighting control network communication band.

For example, a luminaire (FIGS. 3A-C) that includes a sensor/control module 315 having a micro-control unit 330 that executes lighting application 327 is a lighting control device. A wall switch or touch panel (FIGS. 4A-C) that includes a sensor/control module 415 having a micro-control unit 430 that executes lighting application 427 is a lighting control device. A plug load controller (FIG. 5) that includes a micro-control unit 530 that executes lighting application 527 is a lighting control device. A power pack (FIG. 6) that includes a micro-control unit 630 that executes lighting application 627 is a lighting control device.

The lighting control system 1 may be designed for indoor commercial spaces. As shown, system 1 includes a variety of lighting control devices, such as a set of luminaires 10A-N (lighting fixtures) and a set of wall switches 20A-N. Daylight, occupancy, and audio sensors are embedded in lighting control devices, in this case luminaires 10A-N to enable controls for occupancy and dimming.

Luminaires 10A-N, wall switches 20A-N, plug load controller 30, and power pack 35 communicate control over a 900 MHz (sub-GHz) wireless control network 5 and accordingly each include a first radio in the sub-GHz range. A variety of controls are transmitted over wireless control network 5, including, for example, turn lights on/off, dim up/down, set scene (e.g., a predetermined light setting), and sensor trip events. Each luminaire 10A-N, wall switch 20A-N, plug load controller 30, and power pack 35, is also equipped with a second near range Bluetooth Low Energy (BLE) radio that communicate over commissioning network 7 for purposes commissioning and maintenance the wireless lighting control system 1, however no controls pass over this commissioning network 7.

Plug load controller 30 plugs into existing AC wall outlets, for example, and allows existing wired lighting devices, such as table lamps or floor lamps that plug into a wall outlet, to operate in the lighting control system 1. The plug load controller 30 instantiates the table lamp or floor lamp by allowing for commissioning and maintenance operations and processes wireless lighting controls in order to the allow the lighting device to operate in the lighting control system 1.

Power pack 35 retrofits with existing wired light fixtures (luminaires). The power pack 35 instantiates the wired light fixture by allowing for commissioning and maintenance operations and processes wireless lighting controls in order to allow the lighting device to operate in the lighting control system 1.

Both plug load controller 30 and power pack 35 can include the same circuitry, hardware, and software as light fixtures 10A-N and wall switches 20A-N.

The system 1 is provisioned with a mobile device 25 that includes a commissioning/maintenance application 22 for commissioning and maintenance functions of the lighting control system 1. For example, mobile device 25 enables mobile commissioning, configuration, and maintenance functions and can be a PDA or smartphone type of device with human interfacing mechanisms sufficient to perform clear and uncluttered user directed operations. Mobile device 25 runs mobile type applications on iOS7, Android KitKat, and windows 10 operating systems and commissioning/maintenance application 22 to support commissioning.

Web enabled (cloud) services for facilitating commissioning and maintenance activities is also provided by mobile device 25. The commissioning/maintenance application 22 of mobile commissioning device 25 interfaces with the cloud services to acquire installation and configuration information for upload to luminaires 10A-N, wall switches 20A-N, plug load controller 30, and power pack 35. The installation and configuration information is received by mobile device 25 from the gateway 55. The gateway 50 engages in communication through the wide area network (WAN) 55.

Lighting control system 1 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting control system 1 includes a communications backbone and includes model—transport, network, media access control (MAC)/physical layer (PHY) functions. The sub-GHz communications of the wireless control network 5 features are built on a near 802.15.4 MAC and PHY implantation with network and transport features architected for special purpose control and air time optimizations to limit chatter.

The lighting control system 1 can be deployed in standalone or integrated environments. System 1 can be a an integrated deployment, or a deployment of standalone groups with no gateway 50. One or more groups of lighting control system 1 may operate independently of one another with no backhaul connections to other networks.

Lighting control system 1 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 50 for backhaul connection, time sync control, data collection and management capabilities, and interoperation with the Acuity Brands Lighting's commercially available SensorView product may also be provided.

As shown in FIG. 1B, control, configuration, and maintenance operations of the lighting control system 1 involve networked collaboration between the luminaires 10A-N, wall switches 20A-N, plug load controller(s) 30, and power pack(s) 35 that comprise a lighting control group. An installation is comprised of one or more lighting control groups each operating independently of one another. One or more lighting control groups may exist in the wireless control network 5. Each lighting control group will have a group monitor, and this is shown in FIG. 1B where there a two groups and each group has a monitor.

Groups are formed during commissioning of the lighting control system 1 where all members of the group are connected together over wireless control network 5, which in our example is a sub-GHz subnetwork defined by an RF channel and a lighting control group identifier.

The lighting control devices subscribe to channels and only listen for/react to messages on the RF channel with the identifier (ID) of the subscribed channel that designates the lighting control group that the lighting control device is a member of. For example, the lighting control devices subscribe to a multicast group as identified by the lighting control group identifier and only react to messages on the RF channel of the lighting control group.

In general, groups do not share RF channels and thus form their own RF subnetwork, however with only 10 available channels some overlap is inevitable. Analysis and simulation have indicated that group distribution and spatial separation will mitigate the congestion and collision side effects that can occur when many lighting control devices 10A-N, 20A-N, 30, 35 share a singular RF enclave.

A group can be further divided to address control to specific control zones within the group defined by a control zone identifier. Zone communications are managed as addressable features at run time. Up to 16 independent zones of control are available for each group and each group can support up to 128 addressable elements (luminaires 10A-N, wall switches 20A-N, plug load controller 30, power pack 35).

The wireless control network 5 distributes control messages and events, network management messages and events, health and failover events, and group commissioning and maintenance communications, such as firmware update distributions and group membership changes.

Wireless control network 5 provides a secure control network (Sub-GHz) on which to operate. Devices are manually added to the wireless control network 5 via the commissioning process via commissioning/maintenance application 22 of mobile device 25. The commissioning process includes authorization and authentication features that allow only trusted and known entities to add confirmed devices 10A-N, 20A-N, 30, 35 to the network. Requirements relating to network modification (device add/delete/modify) are allocated to the mobile device 25 and its interface (commissioning/maintenance application 22) to the lighting control system 1.

Message authentication in the lighting control system 1 is provided by the 802.15.4 compliant MAC layer solution commercially available from Silicon Labs. The solution uses the AES CCM block cypher mode of operation to secure over the air frames. The mode of operation provides NIST compliant authentication, encryption, and integrity assurance to defeat replay attacks as well as device and message spoofing.

Lighting control system 1 also implements an additional layer of authentication by performing checks on the message source and addressing mechanisms to reject messages from unknown sources (i.e. sources that are not authorized members of a lighting control group network). An intrusion detection scheme using the above schemes and that reports such events will be made via the gateway 50.

The sub-GHz MAC/PHY (wireless control network 5) thus provides secure communication features (authentication, data integrity, and encryption assurance) based on the 802.15.4 standard.

The lighting control devices over the wireless control network 5 together may engage in any-to-many (unicast and multicast) communication and can implement a non-mesh wireless network topology. In our example, wireless control network 5 is a star topology network. Although other network schemes may be utilized, a star topology may be the best fit for aligning the required control communications features with the characteristics of sub-GHz wireless radio. At the center of each lighting control group in a star topology wireless control network 5 is a singular group monitor as shown in FIG. 1B. In FIG. 1B, luminaire 10A is the group monitor for lighting control group 1 and luminaire 10B is the group monitor for lighting control group 2. Lighting control group 1 further comprises luminaire 10N, wall switch 20A, and plug load controller 30. Lighting control group 2 further comprises wall switch 20B and power pack 35.

The monitor is responsible for receiving control events from their source (luminaires 10A-N, wall switches 20A-N, plug load controller 30, and power pack 35) and ensuring reliable and timely delivery of the event to the other members of the group. The monitor uses a quick best effort multicast mechanism for fast high-probability delivery. The monitor follows up the multicast with a reliable point to point communication to ensure that all destination devices received the event.

Commissioning

Commissioning is the process that sets the lighting control configuration and settings that drive the behavior of the lighting control system 1. One or more mobile devices 25 can be used to commission the installation of lighting control system 1. During setup, commissioning/maintenance application 22 of the mobile device 25 provides a secure method for a system installer to configure the lighting control devices (LCDs) for installation commissioning. The lighting control devices include luminaires 10A-N, wall switches 20A-N, plug load controller 30, and power pack 35.

General behavioral settings and network addressing information are stored on the mobile device 25 for upload and allocation to the installation's lighting control devices via commissioning/maintenance application 22. The installation information is managed by commissioning/maintenance application 22 of mobile device 25 to ensure correctness and to eliminate common errors such as assignment of duplicate network addresses. Communication between the mobile device 25 for commissioning/maintenance and the lighting control devices is over the commissioning network 7, such as a BLE network. The lighting control devices are initially in an installation state, beaconing their advertisements when the commissioning starts.

Upon connection with the mobile device 25, the commissioning/maintenance application 22 of mobile device 25 transitions the lighting control devices to a commissioning state. Further upon connection, the lighting control device authenticates the mobile device 25 and is ready to accept commands over the commissioning network 7. The wall switches 20A-N suppress sleep mode until completion of the commissioning process and transition to operational mode. Wall switches 20A-N will re-enter sleep mode if the commissioning process is interrupted—two elapsed hours with no activity.

An installation is commissioned according to lighting control groups. A group is a collection of LCDs sharing the same space within an installation (e.g. a room or area). Each lighting control group in the installation has a special lighting control device called the group monitor. The group monitor keeps tabs on the overall state and health of the lighting control devices within the group and assists in the communication of lighting control events between group elements. In general, one can visualize the group network topology as a star with the group monitor as the central node and the remainder of the group's lighting control devices at points of the star.

A group is commissioned by first establishing the group's lighting control network 5 and then configuring the group's control behavior. The lighting control network 5 is established over a 802.15.4 based MAC riding on top of a sub-GHz (904 MHz to 926 MHz) PHY. The commissioning network 7, such as a Bluetooth Low Energy MAC/PHY, is used to as the point to point connection medium to transfer control network configuration from the commissioning/maintenance application 22 of the mobile device 25 to a lighting control device The commissioning/maintenance application 22 of mobile device 25 builds a network table of the group devices while establishing the lighting control network 5. The network table, used by the group monitor in the execution of its responsibilities, is uploaded from the mobile device 25 to the group's lighting control devices via commissioning/maintenance application 22.

Each lighting control device also has a behavioral configuration. The configuration is specified by a group of settings that define control characteristics such as sensor set points, delays, modes, and ranges. The control characteristics also specify independent zones of control within the group. These characteristics and settings are customized as necessary and uploaded from the mobile device 25 to each lighting control device via commissioning/maintenance application 22.

During the commissioning process, line powered lighting control devices are installed, powered, and advertising over BLE. Battery powered lighting control devices, such as wall switches 20A-N, are installed and in sleep mode to conserve power. After the mobile device 25 is setup, an installer opens the commissioning/maintenance application 22 on the mobile device 25 and walks into an area of the installation that is ready to commission as a lighting control group.

Configuring a Group Network

Wall switches 20A-N and luminaires 10A-N are under the command of the mobile device 25 and respond to a sequence of commands to configure a group network. The wall switches 20A-N respond to a blink request by rapidly blinking an LED. The LED pilot light brightness level is set to a maximum. The luminaires 10A-N responds to a blink request by rapidly blinking an LED light pack. At any time, the lighting control device, including luminaires 10A-N, wall switches 20A-N, plug load controller 30, plug pack 35, etc., ceases blinking upon command. The device then accepts the sub-GHz short MAC address, group number, group name, group RF channel, and personal area network (PAN) ID from the mobile device 25. The device persists this information in non-volatile memory (NVM). The device ceases blinking.

The lighting control device accepts the settings from the commissioning/maintenance application 22 of mobile device 25 and persists the settings in non-volatile memory. Additionally, lighting control devices that are luminaires 10A-N also receive settings for an on-board controller (MCU) and on-board integrated sensors. The lighting control device may also receive a request to execute an RF spectrum scan to determine the group RF channel. If so, the lighting control device executes the scan and returns the results to the mobile device 25 for distribution to the other group devices.

The above sequence of commands issued from the commissioning/maintenance application 22 of mobile device 25 are expected to be in order. Commands received out of order are consider to be an intrusion attempt. The lighting control device configures its media access control (MAC) layer device circuitry and its physical layer circuitry for the OSI model (PHY) with the data transferred from the mobile device 25 and remains in commissioning state.

Connecting a Group Network

To connect to the group network, the lighting control devices accept the group address table from the mobile device 25. The group address table identifies all of the lighting control devices in the group. The device persists this information in non-volatile memory. The device uses the lighting control network 5 (e.g., sub-GHz network) to pass the group address table to the other lighting control devices, such as luminaires 10A-N and wall switches 20A-N, in the group. The communication over the lighting control network 5 is reliable-unicast and may involve some message segmenting if the table size exceeds transport protocol data unit (PDU) size.

The lighting control device returns a status to the mobile device 25 indicating success or failures encountered while distributing the table. The lighting control device accepts a command to tune the group RF transmission (TX) power levels and executes the tune according to the discussion below.

The commissioning/maintenance application 22 of mobile device 25 disconnects after issuing the command to tune the group RF TX power levels. The above sequence of commands issued from the mobile device 25 are expected to be in order. As noted previously, commands received out of order are consider to be an intrusion attempt. Upon completion, the lighting control devices in the group transition to an operational state.

Radio Frequency Channel Selection

The group RF channel is determined at commissioning time by a line powered lighting fixture, such as luminaires 10A-N. The commissioning/maintenance application 22 of mobile device 25 requests the A spectrum scan of the available channels (10) seeking the channel with the lowest average noise level measured over a short period of time.

The process is as follows. Mobile device 25 is connected to a luminaire 10A-N via the commission network 7 (e.g., BLE). The mobile device 25 requests a spectrum scan indicating the number of samples/per channel to be produced. The luminaire 10A-N executes a passive scan of the following channels (channel number, center frequency):

1 904 MHz
2 906 MHz
3 908 MHz
4 910 MHz
5 912 MHz
6 914 MHz
7 916 MHz
8 918 MHz
9 920 MHz
10 922 MHz
11 924 MHz
12 926 MHz

The luminaire 10A-N returns the average energy and peak energy detected for each channel. The commissioning/maintenance application 22 of mobile device 25 determines the optimum RF channel from the average and peak energy samples giving preference (via a weighting factor) to channels 5-8. The commissioning/maintenance application 22 of mobile device 25 commands the lighting control device to configure its MAC/PHY to use the optimum RF channel.

A modified method that replaces the above method with one that uses a discovery and link quality measurement to join the optimum gateway subnetwork may also be used. Whatever the method (gateway 50 or non-gateway), the RF channel selection scheme is timely to meet the user experience requirements for commissioning. Alternatively, this procedure may be decoupled from mobile device 25 so that channel selection can also execute independently by lighting control devices, such as luminaires 10A-N and wall switches 20A-N.

Transmission Power Adjustment

Sub-GHz RF TX power levels are managed to optimize intra-group communications in a way that limits adverse effects (collisions, retries, corrupt packets, etc.) on adjacent group subnetworks that happen to be sharing the RF channel. The group monitor executes a link test with each lighting control device in the group as follows. The group monitor sends a link test message to the lighting control device. The device returns a link test response to the group monitor indicating the received strength signal indicator (RSSI-1) of the received message in 1. The group monitor receives the response and notes the RSSI of the received message (RSSI-2). If RSSI-1 is less than the minimum RSSI-1s recorded so far, it records the new minimum RSSI.

The group monitor returns a link test response acknowledgment to the device indicating RSSI-2. The device receives the acknowledgement. The device adjusts it RF TX power appropriately if the RSSI-2 does not fall within the desired range. The device returns a link test status (continue) to the group monitor. The device returns a link test status (complete) if the RSSI-2 is within the desired range. The group monitor receives the link test status. The process repeats if the status indicates continue (is within the desired range). Steps 1 through 6 are repeated until all devices in the group have been tested. The transmission (TX) power adjustment can also be invoked for a single group monitor—device link. In this case, all devices in the group do not need to be tested.

Lighting Control Device Health

The group monitor periodically checks the health of each lighting control device, such as luminaires 10A-N, wall switches 20A-N, plug load controller 30, and power pack 35, in the group. The group monitor runs a round robin check of each group device such that every device receives a request to report health once every hour. In an example, given a group with a maximum number of devices (128), the group monitor will issue a request for health status every 28.125 seconds while a group of six will result in a health request every 10 minutes.

Clock drift and frequency of over the air messaging are not expected to cause undesirable side effects or performance hits to the network 5, however health requests are delayed via a back off timer of 10 seconds during bursts of network traffic to allow potential congestions to clear and make way for higher priority control operations.

The group monitor records faults reported by lighting control devices for later retrieval by commissioning/maintenance application 22 of mobile device 25 for commissioning and maintenance.

Communication Failures

Wireless messaging failures are possible and expected, however continuous failures indicate a problem that might be rectified by adjusting the RF properties of the communications link of lighting control devices, such as luminaires 10A-N and wall switches 20A-N. Continuous failures may result if there is a change to the environment that alters RF performance or in cases where a lighting control device is experiencing internal failures.

Attempts to resolve communications failures are managed by the group monitor rather than separately at each lighting control device. Reliable-unicast messaging acknowledgement is the driver for detecting communications failures.

At lighting control devices, a communication failure occurs when the device transmits a reliable-unicast message and fails to receive an acknowledgement within a retry period. Upon detecting such a failure, the lighting control device increments its counters of total failures and attempts. The lighting control device reports the percentage of failures in response to a request for health status from the group monitor. The lighting control device resets its counters after successful report of health status.

At a group monitor, the group monitor associates a four bit counter with each lighting control device in the group for purposes of tracking communication failures. A failure occurs when the group monitor receives no acknowledgement back after transmitting a reliable-unicast message to a group device. The group monitor will increment the counter for that lighting control device whenever a failure occurs. The counter is reset whenever a successful transmission occurs.

If the counter reaches a value of 0x7 for any lighting control device, the group monitor attempts to correct the consistent communication failure by issuing a command to the lighting control device to incrementally increase its RF TX power level.

If the counter reaches a value of 0xE for any lighting control device, the group monitor initiates an RF TX Power adjustment for the link. Counters that reach a max of 0xF remain there and may indicate a dead lighting control device. Power level adjustment trigger may be changed to act on percentage of failures (similar to the device health method below) rather than consecutive failure conditions.

The group monitor 10A issues a command to the lighting control device to incrementally increase its RF TX power level if the device's status indicates transmission failures at or greater than 15%. The group monitor initiates an RF TX Power adjustment for any communications link where the lighting control device's status indicates transmission failures at or greater than 25%.

Figure 2:
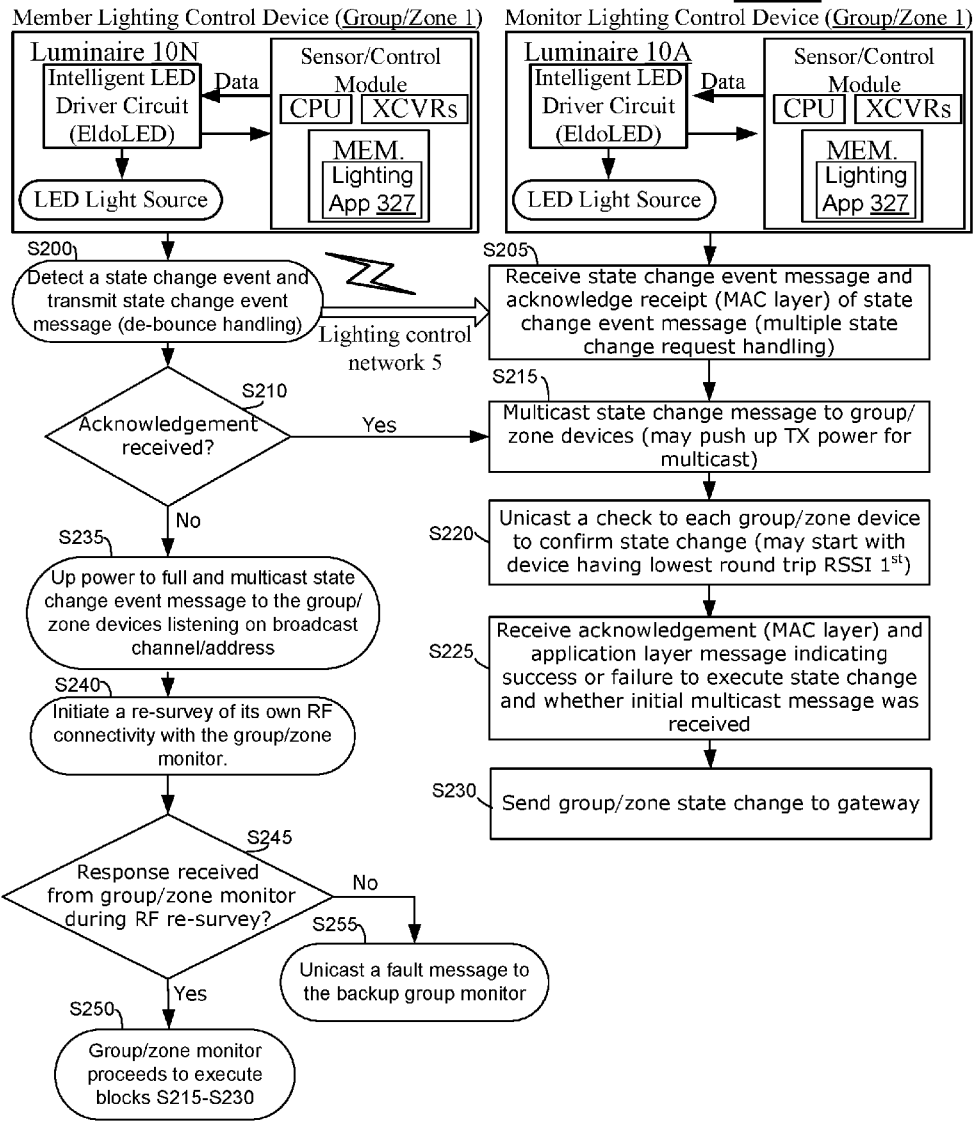
FIG. 2 is a state change event protocol procedure for the lighting control system of FIGS. 1A-B.

FIG. 2 is a state change event protocol procedure for the lighting control system of FIGS. 1A-B. As noted above, a group is a collection of lighting control devices that are managed by a "monitor." A zone is an operational collection of lighting control devices within the group and may comprise the entire group. The group/zone monitor (luminaire 10A in the example) has knowledge of the group/zone configuration (e.g., handled at the network layer level) to execute a reliable delivery check on sensor/switch state changes. Group membership and management functions may be performed by the application layer or the network layer. Luminaire 10A stores a lighting control group network table that maintains a group/zone list of the group/zone that each lighting control device is a member of. The lighting control group network table may be shared with other luminaires and/or sensors, plug load controllers or switches in the group, e.g. to enable failover to another group member upon failure of the group/zone monitor functionality at the luminaire 10A.

Lighting control devices (luminaires 10A-N, wall switches 20A-N, plug load controller 30, and power pack 35) go through a series of states, transitions, and engage in communications with each other upon detecting a state change event of the lighting control system. Although luminaires 10A and 10N are shown in this example, it should be understood that the state change event protocol shown applies to all of the other lighting control devices, such as a wall switches 20A-N, plug load controller 30, power pack 35, or other types of switches/sensors.

Assumptions of the state change event protocol procedure in this example may be the following. Sensor/switches of lighting control devices (luminaires 10A-N, wall switches 20A-N, plug load controller 30, and power pack 35) behave in a similar manner when communicating events at least over the lighting control network 5 (e.g., group and zone network level) and possibly beyond. Battery powered sensors and line powered switches/sensors behave in a similar manner when communicating events at least over the lighting control network 5 and possibly beyond. Lighting control devices, including sensors/switches, attempt to communicate state change of interest directly to gateway 50. A group monitor may communicate group/zone state change to the group/zone devices and the gateway 50 in addition to the sensors/switches.

Battery life conservation may drive the design of the communication pattern, e.g. for communications for a battery powered wall switch, sensor or the like. There may be a 1 second maximum time for event detection to lights on/off. State change events involve a state change of an occupancy, audio, or daylight sensor (e.g., a new reading different from a previous reading), or a switch to turn lighting on/off, dim up/down, or set scene. For example, state change includes on/off for switches, occupied/unoccupied for occupancy sensors, and lighting intensity adjustments for dimmers. Groups may be subdivided into zones. Switches and sensors control a group or zones within the group. A zone may comprise an entire group (e.g., all on/off).

In the example, luminaire 10N is a member lighting control device of group/zone 1 and zone 1 includes all members of group 1. Beginning in block S200, programming in a memory of the luminaire 10N, specifically lighting application 327, configures a processor of the luminaire 10N to detect a state change event and transmit a state change event message via the lighting control network communication band to a monitor lighting control device of group/zone 1 (luminaire 10A). For example, drive/sense circuitry 335 of luminaire 10N detects a state change event via detector(s) 365. Alternatively, if the lighting control device is a wall switch 20, then drive/sense circuitry 435 detects a state change event via switches 465.

Situations may arise that require protection in order to maintain integrity of the lighting control system 1. For example, a rapid fire communication of multiple switch events could overwhelm the ability of the group/zone 1 monitor (luminaire 10A) to issue a state change multicast message and perform a state change check with each lighting control device in the group. Having sensor/switch de-bounce capability addresses this potential problem. The de-bounce mechanism limits the rate at which state change event messages can be initiated by a sensor/switch. Luminaire 10N checks the hardware state of detector(s) 365 and, if a state change is detected, luminaire 10N performs the following two steps. First, the luminaire 10N unicasts a state change event message to the group 1 monitor (luminaire 10A) using a reliable effort. Reliable effort means that if an acknowledgement is not received from the recipient, then a retry effort is made to resend the message to the recipient. Second, the luminaire 10N also unicasts a state change event message to the gateway 50 using a best effort (not shown). Best effort means that if an acknowledgement is not received from the recipient, then no retry effort is made to resend the message to the recipient. Luminaire 10N then delays for a regular polling period (e.g., 1 second) before re-checking the hardware state of sensors/switches again. Of note, if the group/zone 1 member lighting control device is a wall switch instead of a luminaire, then a switch change similarly results in a state change event message. However, if the member lighting control device that sent the original state change message is battery operated (e.g., a wall switch), then the regular polling period may be extended to a longer period of time (e.g., 10 seconds) or there may not be any polling at all to conserve battery life.

Lighting application 327 builds application control messages, such as the state change event message. The state change event message is sent to the transport layer by the lighting application 327 for unicast transmission to luminaire 10A.

Moving to block S205, luminaire 10A (monitor of group/zone 1) receives the state change event message and acknowledges receipt of the state change event message. Luminaire 10A examines the application message body, determines that the protocol relates to lighting control operation, and extracts the payload.

To handle multiple concurrent group/zone state change requests, luminaire 10A determines if the received message involves a group/zone state change while a state change is in progress for the exact same group/zone. If the received message is for the same group/zone, then luminaire 10A cancels the in-progress activity and executes the new state change.

Continuing in block S210, luminaire 10N determines whether an acknowledgement of the state change event message has been received from luminaire 10A acting as the group/zone monitor. If the acknowledgment message has been received, then block S215 is entered.

In block S215, luminaire 10A as the group/zone monitor multicasts a state change event message to all of the lighting control group/zone devices in a respective lighting control group/zone. In the example, if the payload indicates an inter-zone group, then the luminaire 10A performs a look up in a zone table to see if any local lighting control devices are members of that group. If the local lighting control devices are members of the inter-zone group or if the payload indicates an intra-zone group, then luminaire 10A (zone monitor) broadcasts the message (e.g., 3 times), with the zone set to the zone identifier and the protocol set to lighting control operation. The multicast message may be addressed to a group/zone broadcast group address or channel. Luminaire 10A may push up the transmission (TX) power for the multicast.

Proceeding now to block S220, luminaire 10A begins a unicast check with each local lighting control device participating in the group to confirm receipt of the multicast message. Luminaire 10A unicasts (reliable effort) a check to each lighting control device in the group/zone to confirm state change. The luminaire 10A may unicast in order beginning with the lighting control device with the lowest received strength signal indicator (RSSI) and then proceed in ascending order. Alternatively, luminaire 10A may unicast in order beginning with the lighting control device with the highest round-trip time (RTT) and then proceed in descending order.

Moving now to block S225, the zone lighting control devices receive the broadcast message and determine whether the device itself is in the targeted lighting control group/zone. If the lighting control device is not in the targeted lighting control group/zone, then the message is discarded. The message, minus transport header, is passed to the lighting application 327. The lighting application 327 uses the payload of the message and its internal settings to determine whether or not the message is to be processed. If the message is processed, then the LED light source of the lighting control device is adjusted (e.g., turned on/off) in accordance with the state change event.

Each lighting control device in the group/zone with exception of the original member lighting control device 10N that sent the original state change message, returns an acknowledgment message (MAC layer) and an application layer message (reliable effort) indicating the success or failure to execute the state change event from the state change event message, thereby enabling tracking. Further, each acknowledgement includes an indication whether the initial multicast message from block S215 was received by the respective lighting control device. The acknowledgment message is received by luminaire 10A. In an example, if a switch controls 15 light fixtures then the group monitor of the respective lighting control group would receive 15 acknowledgment messages back after communicating the state change, thereby tracking the output of the light fixtures.

Continuing to block S230, luminaire 10A also sends the state change event message to gateway computer 50, for example, via unicast and using a reliable effort. However, if the member lighting control device that sent the original state change message is battery operated (e.g., a wall switch), then the monitor lighting control device sends the state change event message to gateway computer 50, for example, via unicast and using a reliable effort to conserve battery power.

Moving back to step S210, if luminaire 10N determines that no acknowledgement of the state change event message has been received from luminaire 10A (group monitor), then block S235 is entered. This indicates that the group monitor received the state change event message in block S205, but the sensor/switch (luminaire 10N) did not hear an acknowledgement message back from the group monitor. Alternatively, this means that the group monitor never actually received the state change event message. In either case, luminaire 10N powers a wireless radio communication interface up to full power and multicasts a state change event message to group/zone lighting control devices listening on a respective broadcast channel or address.

Next, in block S240, luminaire 10N initiates a re-survey of its RF connectivity with luminaire 10A. The group monitor tracks RF net degradation over time using aggregated stats and then initiates the RF re-scan. As shown in block S245, if a response from luminaire 10A is received, then block S250 is entered, which indicates luminaire 10A is now operating correctly. Accordingly, in block S250 the protocol branches to block S215 so that luminaire 10A proceeds to execute the steps shown as S215-S230. Any time luminaire 10A hears the multicast message of block S235 without hearing the unicast message of block S200, the group/zone monitor branches to block S220 and unicasts a check to each group/zone device to confirm state change (as shown in block S220). Blocks S225 and S230 will subsequently be entered as well.

However, if a response is not received luminaire 10A in block S245, then luminaire 10N assumes that luminaire 10A has failed operating. Accordingly, in block S255, the luminaire 10N unicasts a fault message to the backup group/zone monitor, for example, the backup group/zone monitor is the second entry listed in the lighting control group network table, A table of different state change event message communication types and transmission protocols is shown below. Various message exchanges that occur upon control actions (e.g., wall switch activated), including the number and nature (source, destination, type—unicast/broadcast/multicast) is shown.

| Pattern | Source | Destination | Transport Scheme | Use |
|---|---|---|---|---|
| One to one reliable | Sensor/Switch (all) | Zone monitor | Redbox unicast/MAC unicast with ack/retry | Occupancy, photo sensor state change |
| One to one best effort | Sensor/Switch (all) | Gateway | Redbox unicast/MAC unicast | On selected state change |
| One to many best effort | Zone monitor | Selected zone devices | Redbox unicast/MAC broadcast, addressed to zone/broadcast channel | Occupancy, photo sensor state change |
| One to one reliable | Zone monitor | Selected zone devices | Redbox unicast/MAC unicast with ack/retry | Zone monitor checks devices to confirm state change |
| One to one reliable | Selected zone devices | Zone monitor | Redbox unicast/MAC unicast with ack/retry | Application layer confirmation of state change |
| One to one reliable | Zone monitor | Gateway | Redbox unicast/MAC unicast | On selected state change |
| One to many best effort | Sensor/Switch (all) | Selected zone devices | Redbox unicast/MAC broadcast, addressed to zone/broadcast channel | On failure to hear ack from zone monitor on occupancy, photo sensor state change |
| One to one reliable | Sensor/Switch (all) | Zone monitor | Redbox unicast/MAC unicast | Request RF survey |
| One to one reliable | Zone monitor | Sensor/Switch (all) | Redbox unicast/MAC unicast | Response to RF survey request |
| One to many best effort | Sensor/Switch (sleepy) | All zone devices | Redbox unicast/MAC broadcast, addressed to zone | Zone monitor discover message |
| One to one reliable | Zone monitor | Sensor/Switch (sleepy) | With ack/retry | Reply to zone monitor discover |

Figure 3A:
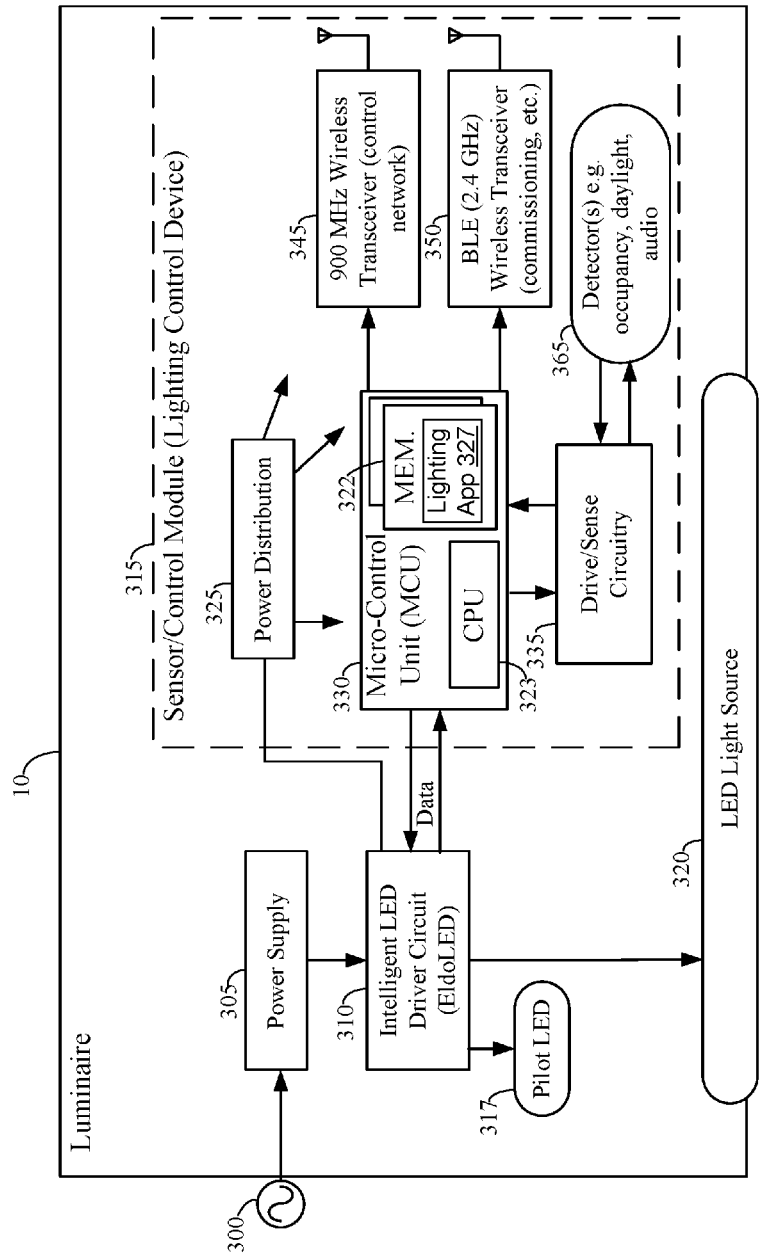

FIGS. 3A-C are block diagrams of a luminaire 10 that communicate via the lighting control system of FIGS. 1A-B. Luminaire 10 is an integrated light fixture that generally includes a power supply 305 driven by a power source 300. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for luminaire 10.

Luminaire 10 furthers include an intelligent LED driver circuit 310, sensor/control module 315, and a light emitting diode (LED) light source 320. Intelligent LED driver circuit 310 is coupled to LED light source 320 and drives that LED light source 320 by regulating the power to LED light source 320 by providing a constant quantity or power to LED light source 320 as its electrical properties change with temperature, for example. The intelligent LED driver circuit 310 includes a driver circuit that provides power to LED light source 320 and a pilot LED 317. The pilot LED 317 may be included as part of the sensor/control module 315. Intelligent LED driver circuit 310 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 310 is manufactured by EldoLED.

LED driver circuit 310 can further include an AC or DC current source or voltage source, a regulator, an amplifier (such as a linear amplifier or switching amplifier), a buck, boost, or buck/boost converter, or any other similar type of circuit or component. LED driver circuit 310 outputs a variable voltage or current to the LED light source 320 that may include a DC offset, such that its average value is nonzero, and/or a AC voltage. The pilot LED 317 indicates the state of the luminaire 10, for example, during the commissioning and maintenance process.

For purposes of communication and control, luminaire 10 is treated as single addressable device that can be configured to operate as a member of one or more lighting control groups or zones. The luminaire 10 is line powered and remains operational as long as power is available.

Sensor/control module 315 includes power distribution circuitry 325, a micro-control unit (MCU) 330, drive/sense circuitry 335, and detector(s) 365. As shown, MCU 330 is coupled to LED driver circuit 310 and controls the light source operation of the LED light source 320. MCU 330 includes a memory 322 (volatile and non-volatile) and a central processing unit (CPU) 323. The memory 322 includes a lighting application 327 (which can be firmware) for both lighting control operations and commissioning, maintenance, and diagnostic operations. The power distribution circuitry 325 distributes power and ground voltages to the MCU 330, drive/sense circuitry 335, wireless transceivers 345 and 350, and detector(s) 365 to provide reliable operation of the various circuitry on the sensor/control module 315 chip.

Luminaire 10 also includes a dual-band wireless radio communication interface system configured for two way wireless communication. It should be understood that "dual-band" means communications over two separate RF bands. The communication over the two separate RF bands can occur simultaneously (concurrently); however, it should be understood that the communication over the two separate RF bands may not actually occur simultaneously. In our example, luminaire 10 has a radio set that includes radio 345 for sub-GHz communications and another radio 350 for Bluetooth RF communications. A first transceiver 345, such as a 900 MHz wireless transceiver, issues control operations on the lighting control network. This first transceiver 345 is for any-to-many (unicast and multicast) communication, over a first of the two different wireless communication bands, of control and systems operations information, during luminaire operation and during control network operation over the first wireless communication band. Two transport methods ride on the network layer function of the first transceiver 345: unicast and multicast. The first transceiver 345 engages in multicast group communication of a one-to-many or a many-to-many distribution where group communication is addressed to a group simultaneously.

A second transceiver 350, such as a 2.4 GHz BLE (Bluetooth) wireless transceiver carries out commissioning, maintenance, and diagnostics of the lighting control network. This second transceiver 350 is for point-to-point communication, over a second of the two different wireless communication bands, of information other than the control and systems operations information, concurrently with at least some communications over the first wireless communication band.

As shown, the MCU 330 includes programming in the memory 322 which configures the CPU (processor) 323 to control operations of the respective luminaire 10, including the communications over the two different wireless communication bands via the dual-band wireless radio communication interface system 345, 350. The programming in the memory 322 includes a real-time operating system (RTOS) and further includes a lighting application 327 which is firmware/software that engages in communications with the commissioning/maintenance application 22 of mobile device 25 over the commissioning network 7 of FIGS. 1A-B. The lighting application 327 programming in the memory 322 carries out lighting control operations over the lighting control network 5 of FIGS. 1A-B. The RTOS supports multiple concurrent processing threads for different simultaneous control or communication operations of the luminaire 10.

Three different CPU and memory architectures are shown for the sensor/control module 315 and the MCU 330 of the luminaire 10 in FIGS. 3A-C. In FIG. 3A, in addition to the memory 322 and the CPU 323 of the MCU 330 itself, the first transceiver 345 and the second transceiver 350 each include a separate memory (not shown) and a processor (not shown). Hence, in the example of FIG. 3A, the sensor/control module 15 includes a total of three processors and three sets of memory.

In FIG. 3B, the MCU 330 itself does not include a separate memory 322 and a CPU 323. Instead, only the first transceiver 345 and the second transceiver 350 each include a separate memory 322 and a processor 323. For efficiency purposes, such as to save manufacturing costs and conserve power (e.g., line power or battery power), the memory 322 and CPU 323 of the first transceiver 345 is selected to perform processing because the majority of processing (normal lighting control operations) occur over the sub-GHz wireless control network 5. Hence, in the example of FIG. 3B, the sensor/control module 315 includes a total of two processors and two sets of memory.

In FIG. 3C, the MCU 330 comprises a dual band system on chip (SOC) 345, 350 and the MCU 330 itself does not include a separate memory 322 and a CPU 323. Instead, the first transceiver 345 and the second transceiver 350 are integrated and combined into the chipset of the MCU 330. Hence, in the example of FIG. 3C, the sensor/control module 315 includes a total of one processor and one set of memory. Integrating the first transceiver 345 and second transceiver 350 into a dual band SOC chipset of the MCU 330, saves manufacturing costs and conserves power (e.g., line power or battery power).

As shown, luminaire 10 includes detector(s) 365, such as an in-fixture daylight sensor, an occupancy sensor, an audio sensor, a temperature sensor, or other environmental sensor. Detector(s) 365 may be based on Acuity Brands Lighting's commercially available xPoint® Wireless ES7 product. Drive/sense circuitry 335, such as application firmware, drives the in-fixture occupancy, audio, and photo sensor hardware. Outlined below are lighting controls and communications in the lighting control network that occur when drive/sense circuitry 335 of luminaire 10 detects state changes in the detector(s) 365, such as occupancy, daylight, and audio sensors.

Sensor State Change

When an occupancy sensor, daylight sensor, or audio sensor state change occurs is detected by drive/sense circuitry 335, MCU 330 of the luminaire 10 generates a network packet(s) and a wireless message is created with a state change event as at least part of the payload. The message is sent to the group monitor via the transceiver radio 345 as reliable unicast (unless luminaire 10 is hosting the group monitor) by the lighting application 327 running on MCU.

If a gateway 50 (shown in FIGS. 1A-B) is present, a wireless gateway notification is created indicating the sensor, the sensor state (occupied or unoccupied, inhibiting or not inhibiting), the group, and the zone. The message is then unicast to the gateway 50 by the lighting application 327 running on MCU 330.

If the luminaire 10 misses acknowledgement of the wireless message indicating the sensor state change that luminaire 10 unicasted to group monitor within a predetermined time period, for example, then the luminaire 10 generates and issues/transmits a group multicast message indicating the sensor state change. No check message follow up is issued from the luminaire 10 following this multicast message, but such communication faults and anomalies are tallied by the luminaire 10 for health status reporting as described with reference to FIGS. 1A-B.

Group Monitor

The group monitor acknowledges receipt of the unicast message (MAC layer) from the luminaire 10 indicating the sensor state change. The group monitor extracts the payload of the network packet(s) from the unicast message and creates a multicast message in response using the extracted payload of the unicast message. The group monitor interrogates the extracted payload of the unicast message to determine the type of control and the zone. The payload of the multicast message indicates or specifies a lighting control event (e.g., turn on/off or dim a light source) and specifies a lighting control group, for example, using a lighting control group identifier. The created multicast message and extracted payload of the unicast message are temporarily saved. The group monitor transmits the multicast message at least two or three times, for example. The group monitor also sends the extracted payload to the applications that share the processor with the group monitor.

If a gateway 50 (see FIG. 1A) is present and the type of control is occupancy, daylight, or audio sensor related or the zone to make the adjustment to is global, a gateway notification is created indicating the sensor, its state (occupied or unoccupied, inhibiting or not inhibiting), the group, and the zone. The message is then reliably unicast to the gateway 50.

After interrogating the extracted payload to determine the type of control and zone, the group monitor uses the group table to look up the set of lighting control devices that are members of the zone. The group monitor forms a check message using at least part of the extracted payload of the unicast message as the payload. The group monitor sends the message reliable unicast to each device in the zone as a check to confirm the receipt of the multicast in order as specified in the lighting control group network table. This confirmation check is not made with the luminaire 10 that has the sensor that actually initiated the state change event.

The group monitor service accommodates concurrent multiple occupancy, daylighting, or audio events irrespective of zone. The group monitor service cancels a confirmation check if it receives a state that obsolesces an active state in progress. In this case, the group monitor service starts a new confirmation check based on the latest state.

If the group monitor misses the unicast message from the luminaire 10 but gets the multicast issued by the luminaire 10—the group monitor executes the gateway and zone check described above.

Recipient Lighting Control Devices

Upon receipt of a multicast message from the group monitor at a recipient lighting control device (e.g., luminaire, wall switch, plug load controller, or power pack) that was sent in response to the original message from luminaire 10, the recipient device checks the group indication and the counter. The message is discarded if the lighting control device is not a member of the identified lighting control group specified in the message. The message is also discarded if it is a duplicate (multicast switch state change events are transmitted at least two or three times, for example, by the group monitor).

The payload is extracted from the multicast message and processed by the lighting application 327 running on the MCU 330. Upon receipt of the confirmation check, the message is acknowledged (MAC). The recipient lighting control device determines if it has already acted on the event. If not, then the payload is extracted from the unicast message and processed by the lighting application 327 running on the MCU 330. Applications are responsible for either processing the extracted payload or discarding it as out of zone scope.

For example, upon receipt of the multicast message from the lighting control group monitor at a respective recipient lighting control device, the respective recipient lighting control device checks a lighting control group identifier to determine whether the respective recipient control device is a member of the identified lighting control group in the message. The recipient lighting control device then determines whether the recipient lighting control device has already acted on a lighting control event (e.g., turn on/off or dim a light source) for lighting control network operation that is similar or identical to the event in the multicast message. If the recipient lighting control device has not already acted in accordance with the control event for lighting control operation, the recipient lighting control device adjusts one of its own LED light source(s) in accordance with the control event. Alternatively, if the recipient lighting control device has already acted on the lighting control event specified in the multicast message, no further action is taken in response by discarding the multicast message.

In an example, the scope of daylight light sensor control is that of the hosting luminaire 10 itself. Therefore events of this type may only be processed locally and not distributed over the lighting control network 5.

Figure 4A:
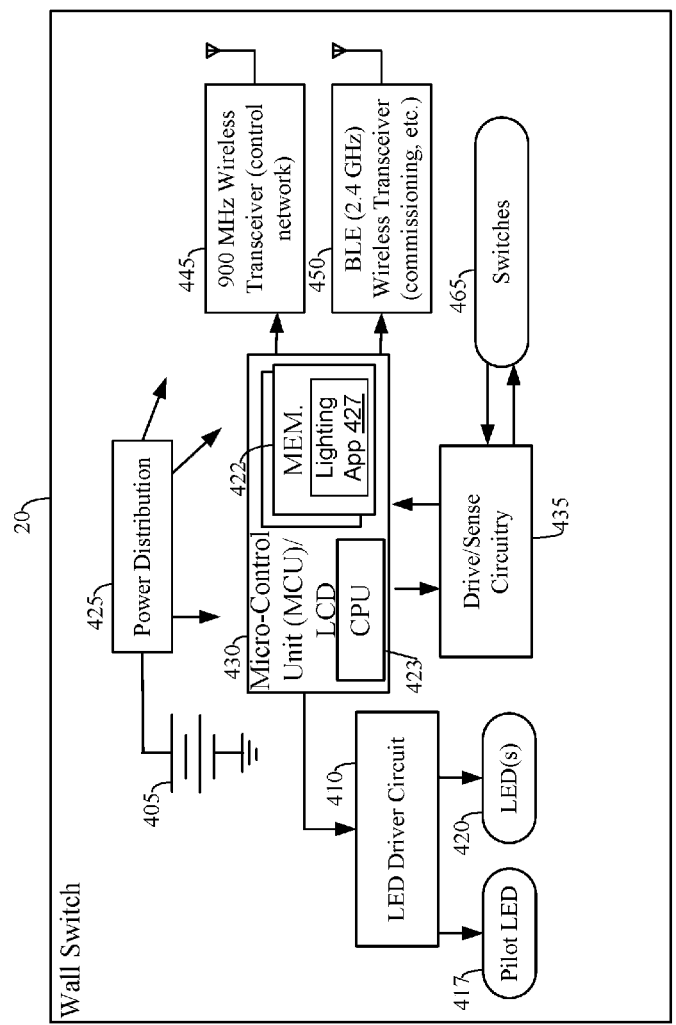
FIGS. 4A-C are block diagrams of different examples of a wall switch that communicates via the lighting control system of FIG. 1A or FIG. 1B.
Figure 4B:
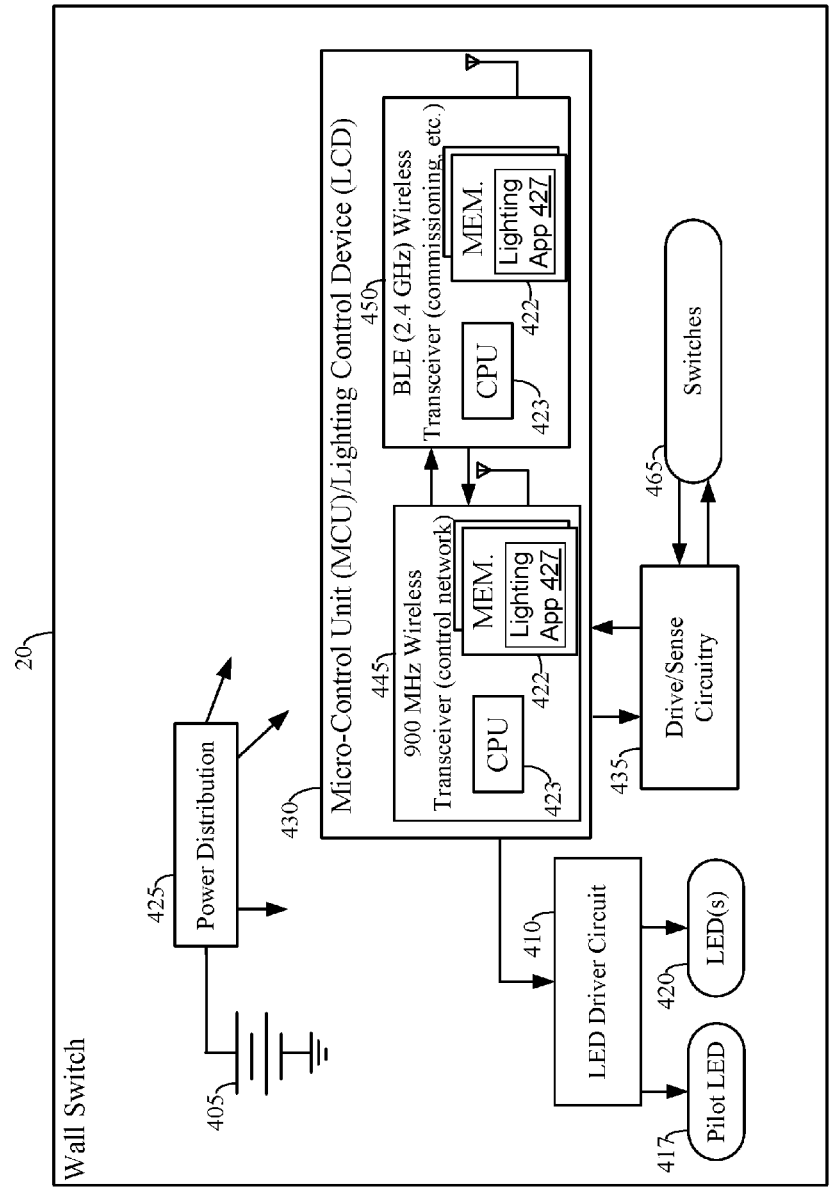
Figure 4C:
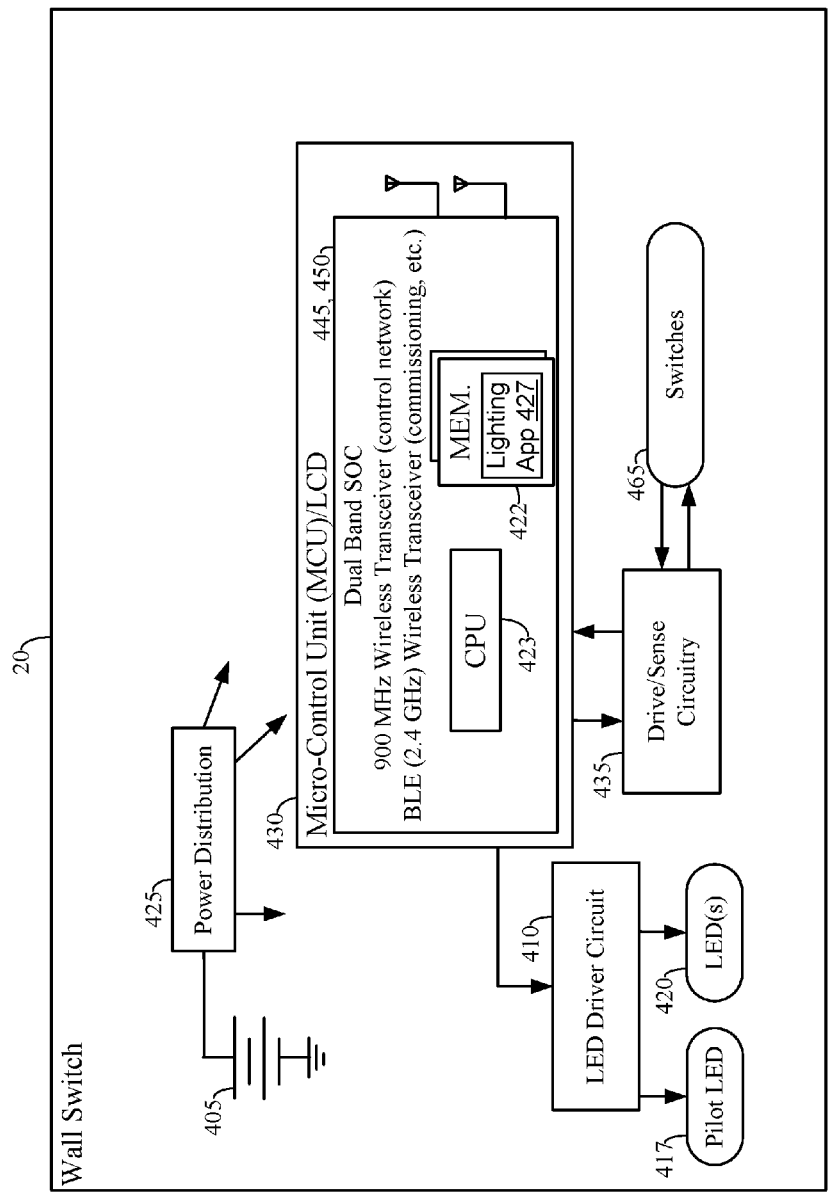

FIGS. 4A-C are block diagrams of a wall switch 20 that communicate via the lighting control system of FIGS. 1A-B. The circuitry, hardware, and software of wall switch 20 shown is similar to the luminaire 10 of FIG. 3. However, wall switch 20 is a controller that can be a battery powered device.

Wall switch 20 is similar to luminaire 10 in that they are singularly addressable devices that can be configured to operate as a member of one or more lighting control groups or zones. As shown, wall switch 20 includes a power supply 405, such as a battery or line power, to power itself. Wall switch 10 furthers include an LED driver circuit 410, and a light emitting diode(s) (LED) 420. LED driver circuit 410 is coupled to LED(s) 420 and drives that LED(s) 420 by regulating the power to LED(s) 420 by providing a constant quantity or power to LED light source 420 as its electrical properties change with temperature, for example. The LED driver circuit 410 includes a driver circuit that provides power to LED(s) 420 and a pilot LED 417. LED driver circuit 410 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 410 is manufactured by EldoLED.

LED driver circuit 410 can further include an AC or DC current source or voltage source, a regulator, an amplifier (such as a linear amplifier or switching amplifier), a buck, boost, or buck/boost converter, or any other similar type of circuit or component. LED driver circuit 410 outputs a variable voltage or current to the LED light source 420 that may include a DC offset, such that its average value is nonzero, and/or a AC voltage. The pilot LED 417 indicates the state of the wall switch 20, for example, during the commissioning and maintenance process.

As shown, an MCU 430 is coupled to LED driver circuit 410 and controls the light source operation of the LED(s) 420. MCU 430 includes a memory 422 (volatile and non-volatile) and a central processing unit (CPU) 423. The memory 422 includes a lighting application 427 (which can be firmware) for both lighting control operations and commissioning/maintenance operations. The power distribution circuitry 425 distributes power and ground voltages to the LED driver circuit 410, MCU 430, drive/sense circuitry 435, wireless transceivers 445 and 450, and switches 465 to provide reliable operation of the various circuitry on the wall switch 20.

Wall switch 20 also includes a dual-band wireless radio communication interface system configured for two way wireless communication. In our example, wall switch 12 has a radio set that includes radio 445 for sub-GHz communications an another radio 450 for Bluetooth RF communication. A first transceiver 445, such as a 900 MHz wireless transceiver, issues control operations on the lighting control network. This first transceiver 445 is for any-to-many (unicast and multicast) communication, over a first of the two different wireless communication bands, of control and systems operations information, during luminaire operation and during control network operation over the first wireless communication band.

A second transceiver 450, such as a 2.4 GHz BLE (Bluetooth) wireless transceiver carries out commissioning and maintenance of the lighting control network. This second transceiver 450 is for point-to-point communication, over a second of the two different wireless communication bands, of information other than the control and systems operations information, concurrently with at least some communications over the first wireless communication band.

As shown, the MCU 430 includes programming in the memory 422 which configures the CPU (processor) 423 to control operations of the respective wall switch 20, including the communications over the two different wireless communication bands via the dual-band wireless radio communication interface system 445, 450. The programming in the memory 422 includes a real-time operating system (RTOS) and further includes a lighting application 427 which is firmware/software that engages in communications with the commissioning/maintenance application 22 of mobile device 25 over the commissioning network 7 of FIGS. 1A-B. The lighting application 427 programming in the memory 422 carries out lighting control operations over the lighting control network 5 of FIGS. 1A-B. The RTOS supports multiple concurrent processing threads for different simultaneous control or communication operations of the wall switch 20.

Three different CPU and memory architectures are shown for the MCU 430 of the wall switch 20 in FIGS. 4A-C. In FIG. 4A, in addition to the memory 422 and the CPU 423 of the MCU 430 itself, the first transceiver 445 and the second transceiver 450 each include a separate memory (not shown) and a processor (not shown). Hence, in the example of FIG. 4A, the MCU 430, first transceiver 445, and second transceiver 450 combine to include a total of three processors and three sets of memory.

In FIG. 4B, the MCU 430 itself does not include a separate memory 422 and a CPU 423. Instead, only the first transceiver 445 and the second transceiver 450 each include a separate memory 422 and a processor 423. For efficiency purposes, such as to save manufacturing costs and conserve power (e.g., line power or battery power), the memory 422 and CPU 423 of the first transceiver 445 is selected to perform processing because the majority of processing (normal lighting control operations) occur over the sub-GHz wireless control network 5. Hence, in the example of FIG. 4B, the sensor/control module 415 includes a total of two processors and two sets of memory.

In FIG. 4C, the MCU 430 comprises a dual band system on chip (SOC) 445, 450 and the MCU 430 itself does not include a separate memory 422 and a CPU 423. Instead, the first transceiver 445 and the second transceiver 450 are integrated and combined into the chipset of the MCU 430. Hence, in the example of FIG. 4C, the MCU 430 includes a total of one processor and one set of memory. Integrating the first transceiver 445 and second transceiver 450 into a dual band SOC chipset of the MCU 330, saves manufacturing costs and conserves power (e.g., line power or battery power).

As shown, wall switch 20 includes switches 465, such as a dimmer switch, set scene switch. Switches 465 can be or include sensors, such as infrared sensors for occupancy or motion detection, an in-fixture daylight sensor, an audio sensor, a temperature sensor, or other environmental sensor. Switches 465 may be based on Acuity Brands Lighting's commercially available xPoint® Wireless ES7 product. Drive/sense circuitry 435, such as application firmware, drives the occupancy, audio, and photo sensor hardware.

In our example, wall switch 20 includes a single shared button switch 465 for on/off functions that requires knowledge of state to differentiate between on and off. The wireless control network 5 communicates output device (luminaire 10, plug load controller 30, power pack 35) state to the wall switches 20 as a means of providing the differentiating state. However, the wireless control network 5 suppresses the communication of output devices to constrain network traffic. Therefore control network 5 will rely on the default mechanism (tracked on the device) for determining on/off on all of the types of wall switch. It is therefore possible for the wall switch 20 to occasionally be out of sync with the actual state of the zone particularly at installation commissioning time. Toggling the switch button 465 one or more times will clear any mismatched state. In our example, wireless control network 5 does not communicate load state via the pilot LED 417 of wall switch 20) 20; however, in other examples wireless control network 5 communicates load state via the pilot LED 417 of wall switch 20.

Outlined below are lighting controls and communications in the lighting control network that occur when drive/sense circuitry 435 detects state changes in the switches 365 of wall switch 20.

Wall Switch Button Pushed

When the on switch 465 is pushed, the lighting application 427 running on MCU 430 generates a network packet(s) having a payload indicating the control event. A wireless message is created with the network packet(s) having the payload indicating the control event. The message is sent to the group monitor as reliable unicast. If a gateway 50 (see FIG. 1A) is present and if the message is a switch on/off control, then a gateway notification is created indicating the wall switch 20, the state of the wall switch 20, the group, and the zone. The message is unicasted to the gateway 50.

If the wall switch 20 is a battery powered (sleepy) type wall switch which uses a sleep feature as a means of power conservation and thus requires a special mechanism to acquire certain communications upon wake up, the following extension is used. The wall switch 20 detects the button push and turns on the transceiver radio 445 and transmits the wireless message with the network packet(s) having the payload indicating the control event. Next, the wall switch 20 cancels its wake up timer. The timer wakes the device to check its mailbox in the case where no button push has occurred for a while. The wall switch 20 sends a request for communications to the mail box server on the group monitor. The group monitor returns the contents of the mailbox addressed to the wall switch.

The wall switch 20 processes each request. Examples include a request for health status or a state change request. The wall switch sets it wake up timer and the timer period is directly related to the frequency of system health reporting. The lighting application 427 de-bounces a continual or rapid button depress sequence so as to not create a message storm at the group monitor. If the wall switch 20 doesn't receive the acknowledgment from the group monitor when the message having the payload indicating the control event is unicasted to the group monitor, then the switch will generate and issue the group multicast. In this instance, no check message follow up is issued from the wall switch 20. Communication faults and anomalies are tallied by the switch for health status reporting as described previously with reference to luminaire 10.

Group Monitor

The group monitor acknowledges (MAC layer) receipt of the unicast message from the wall switch 20 indicating pushing of the on switch 465. The group monitor extracts the payload of the network packet(s) from the unicast message and creates a multicast message in response using the extracted payload of the unicast message. The group monitor interrogates the extracted payload of the unicast message to determine the type of control and the zone. The payload of the multicast message indicates or specifies a lighting control event (e.g., turn on/off or dim a light source) and specifies a lighting control group, for example, using a lighting control group identifier. The created multicast message and extracted payload of the unicast message are temporarily saved. The group monitor transmits the multicast message at least two or three times, for example. The group monitor also sends the extracted payload to the applications that share the processor with the group monitor.

If a gateway 50 (see FIG. 1A) is present and the type of control is a switch on/off or the zone to make the adjustment to is global, then a gateway notification is created indicating the state of the switch, the group, and the zone. The message is reliably unicast to the gateway 50.

The group monitor uses the group table to look up the set of devices that are members of the zone. The group monitor forms a check message using at least part of the saved extracted payload of the unicast message as the payload. The group monitor sends the message (reliable unicast) to each lighting control device in the zone as a check to confirm the receipt of the multicast. Of note, the confirmation check is not made with the wall switch 20 that actually initiated the control event.

The group monitor service accommodates concurrent multiple switch on/off events irrespective of zone. The group monitor service cancels a confirmation check if it receives a state that obsolesces an active state in progress. In this case the group monitor service starts a new confirmation check based on the latest state. If the group monitor misses the unicast message from the switch but gets the multicast issued by the switch—the group monitor executes the gateway and zone check described above.

Recipient Lighting Control Devices

Upon receipt of a multicast message from the group monitor at a recipient lighting control device (e.g., luminaire, wall switch, plug load controller, or power pack) that was sent in response to the original message from wall switch 20, the recipient device checks the group indication and the counter. The message is discarded if the recipient device is not a member of the identified lighting control group specified in the message. The message is also discarded if it is a duplicate (multicast switch state change events are transmitted at least two or three times, for example, by the group monitor). The payload is extracted from the multicast message and processed by the lighting application 427 running on the MCU 430. Upon receipt of the confirmation check, the message is acknowledged (MAC).

The recipient lighting control device determines if it has already acted on the event. If not then the payload is extracted from the unicast message and processed by the lighting application 427. The applications are responsible for either processing the extracted payload or discarding it as out of zone scope.

For example, upon receipt of the multicast message from the lighting control group monitor at a respective recipient lighting control device, the respective recipient lighting control device checks a lighting control group identifier to determine whether the respective recipient control device is a member of the identified lighting control group in the message. The recipient lighting control device then determines whether the recipient lighting control device has already acted on a lighting control event (turn on/off or dim) for lighting control network operation that is similar or identical to the event in the multicast message. If the recipient lighting control device has not already acted in accordance with the control event for lighting control operation, the recipient lighting control device adjusts one of its own LED light source(s) in accordance with the control event. Alternatively, if the recipient lighting control device has already acted on the lighting control event specified in the multicast message, no further action is taken in response by discarding the multicast message.

Figure 5:
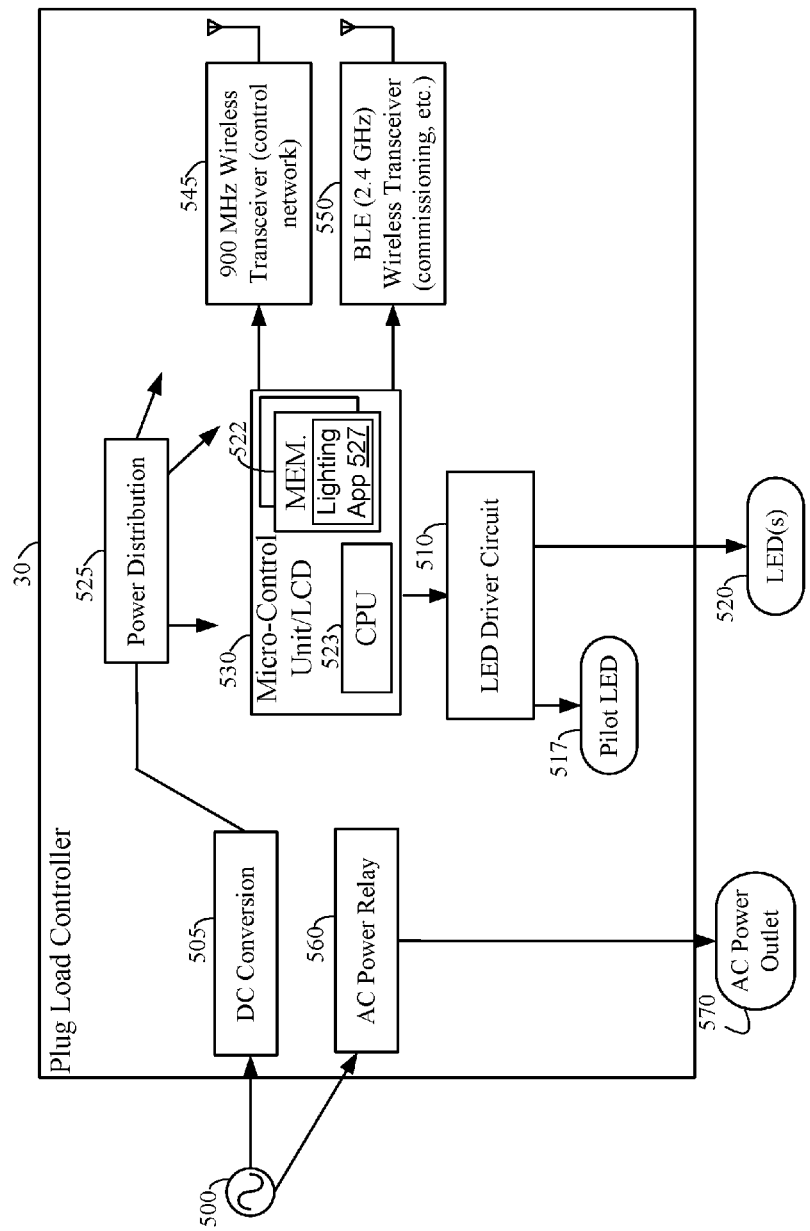
FIG. 5 is a block diagram of a plug load controller that communicates via the lighting control system of FIG. 1B.

FIG. 5 is a block diagram of a plug load controller 30 that communicates via the lighting control system of FIG. 1B. The circuitry, hardware, and software of plug load controller 30 shown is similar to the luminaire 10 of FIG. 3. However, plug load controller 30 is a retrofit device that plugs into existing AC wall outlets, for example, and allows existing wired lighting devices, such as table lamps or floor lamps that plug into a wall outlet, to operate in the lighting control system. The plug load controller 30 instantiates the table lamp or floor lamp by allowing for commissioning and maintenance operations and processes wireless lighting controls in order to the allow the lighting device to operate in the lighting control system.

Plug load controller 30 is similar to luminaire 10 in that they are singularly addressable devices that can be configured to operate as a member of one or more lighting control groups or zones. As shown, plug load controller 30 includes a DC conversion circuit 505 (which may instead be a power supply) driven by a power source 500, in our example, an AC line or mains. Power source 500, however, may be a battery, solar panel, or any other AC or DC source.

DC conversion circuit 505 receives power from the power source 500, and may include a magnetic transformer, electronic transformer, switching converter, rectifier, or any other similar type of circuit to convert an input power signal into a suitable power signal to power itself. Plug load controller 500 further comprises an AC power relay 560 which relays incoming AC power from power source 500 to other devices that may plug into the receptacle of plug load controller 30 thus providing an AC power outlet 570.

Plug load controller 30 furthers include an LED driver circuit 510 and a light emitting diode(s) (LED) 520. LED driver circuit 510 is coupled to LED(s) 520 and drives that LED(s) 520 by regulating the power to LED(s) 520 by providing a constant quantity or power to LED(s) 520 as its electrical properties change with temperature, for example. The LED driver circuit 510 includes a driver circuit that provides power to LED(s) 520 and a pilot LED 517. LED driver circuit 510 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 510 is manufactured by EldoLED.

LED driver circuit 510 can further include an AC or DC current source or voltage source, a regulator, an amplifier (such as a linear amplifier or switching amplifier), a buck, boost, or buck/boost converter, or any other similar type of circuit or component. LED driver circuit 510 outputs a variable voltage or current to the LED(s) 520 that may include a DC offset, such that its average value is nonzero, and/or a AC voltage. The pilot LED 417 indicates the state of the plug load controller 30, for example, during the commissioning and maintenance process.

For purposes of communication and control, plug load controller 30 is treated as single addressable device that can be configured to operate as a member of one or more lighting control groups or zones. The plug load controller 30 is line powered and remains operational as long as power is available.

Plug load controller 30 includes power distribution circuitry 525 and a micro-control unit (MCU) 530. As shown, MCU 530 is coupled to LED driver circuit 510 and controls the light source operation of the LED(s) 520. MCU 530 includes a memory 522 (volatile and non-volatile) and a central processing unit (CPU) 523. The memory 522 includes a lighting application 527 (which can be firmware) for both lighting control operations and commissioning/maintenance operations. The power distribution circuitry 525 distributes power and ground voltages to the LED driver circuit 510, MCU 530, and wireless transceivers 545 and 550 to provide reliable operation of the various circuitry on the plug load controller 30 chip.

Plug load controller 30 also includes a dual-band wireless radio communication interface system configured for two way wireless communication. In our example, plug load controller 30 has a radio set that includes radio 545 for sub-GHz communications and another radio 550 for Bluetooth RF communications. A first transceiver 545, such as a 900 MHz wireless transceiver, issues control operations on the lighting control network. This first transceiver 545 is for any-to-many (unicast and multicast) communication, over a first of the two different wireless communication bands, of control and systems operations information, during luminaire operation and during control network operation over the first wireless communication band.

A second transceiver 550, such as a 2.4 GHz BLE (Bluetooth) wireless transceiver carries out commissioning and maintenance of the lighting control network. This second transceiver 550 is for point-to-point communication, over a second of the two different wireless communication bands, of information other than the control and systems operations information, concurrently with at least some communications over the first wireless communication band.

As shown, the MCU 530 includes programming in the memory 522 which configures the CPU (processor) 523 to control operations of the respective plug load controller 30, including the communications over the two different wireless communication bands via the dual-band wireless radio communication interface system 545, 550. The programming in the memory 522 includes a real-time operating system (RTOS) and further includes a lighting application 527 which is firmware/software that engages in communications with the commissioning/maintenance application 22 of mobile device 25 over the commissioning network 7 of FIGS. 1A-B. The lighting application 527 programming in the memory 522 carries out lighting control operations over the lighting control network 5 of FIGS. 1A-B. The RTOS supports multiple concurrent processing threads for different simultaneous control or communication operations of the plug load controller 30.

Although not shown, it should be understood that the MCU 530 of plug load controller 30 may be of the three different CPU and memory architectures depicted and described for the luminaire 10 in FIGS. 3A-C and the wall switch 20 in FIGS. 4A-C. As explained earlier, integrating the first transceiver 545 and second transceiver 550, for example, into a dual band SOC chipset of the MCU 530, saves manufacturing costs and conserves power (e.g., line power or battery power).

Plug load controller 30 may include detector(s), such as a daylight sensor, an occupancy sensor, an audio sensor, a temperature sensor, or other environmental sensor (not shown). Detector(s) may be based on Acuity Brands Lighting's commercially available xPoint® Wireless ES7 product. Drive/sense circuitry (not shown), such as application firmware, can drive the occupancy and photo sensor hardware.

Figure 6:
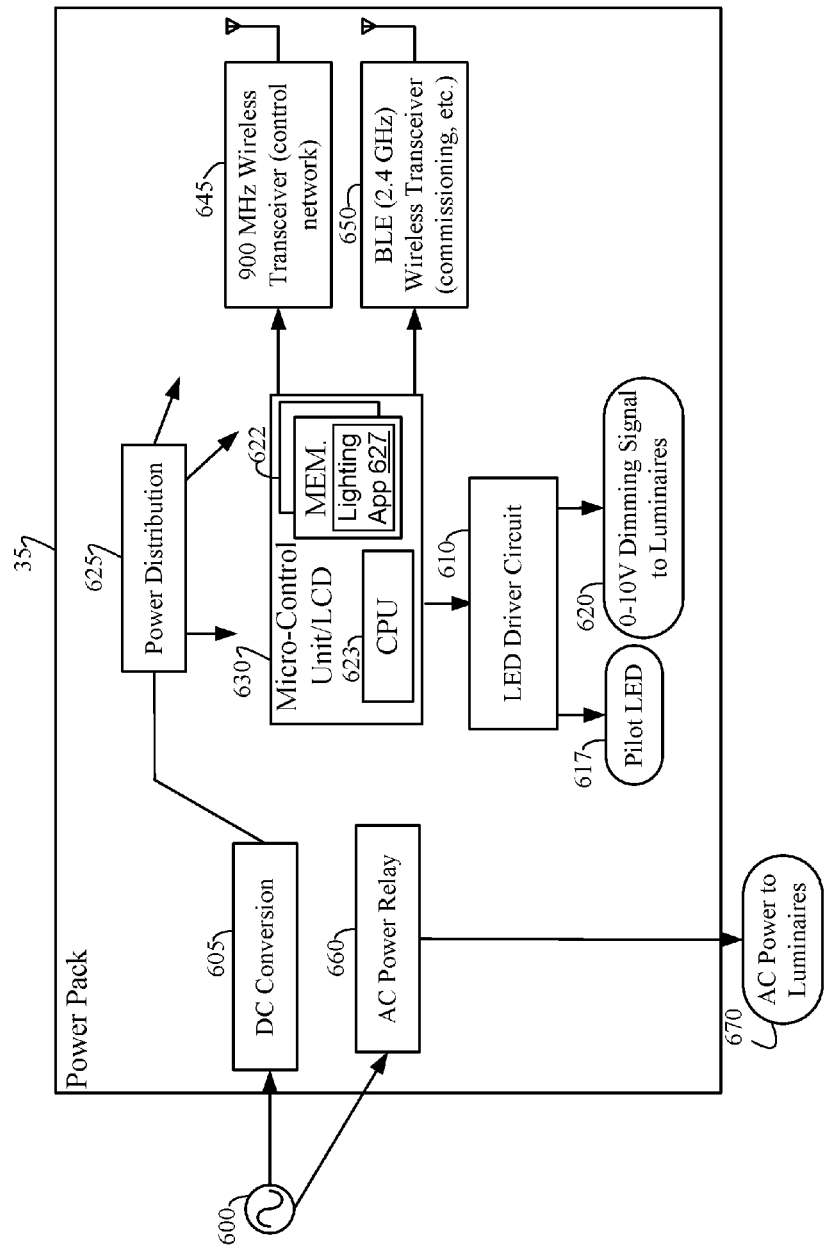
FIG. 6 is a block diagram of a power pack that communicates via the lighting control system of FIG. 1B.

FIG. 6 is a block diagram of a power pack 35 that communicates via the lighting control system of FIG. 1B. The circuitry, hardware, and software of power pack 35 shown is similar to the luminaire 10 of FIG. 3. However, power pack 35 is a device that retrofits with existing wired light fixtures (luminaires). The power pack 35 instantiates the wired light fixture by allowing for commissioning and maintenance operations and processes wireless lighting controls in order to allow the lighting device to operate in the lighting control system.

Power pack 35 is similar to luminaire 10 in that they are singularly addressable devices that can be configured to operate as a member of one or more lighting control groups or zones. As shown, power pack 35 includes a DC conversion circuit 605 (which may instead be a power supply) driven by a power source 600, in our example, an AC line or mains. Power source 600, however, may be a battery, solar panel, or any other AC or DC source.

DC conversion circuit 605 receives power from the power source 600, and may include a magnetic transformer, electronic transformer, switching converter, rectifier, or any other similar type of circuit to convert an input power signal into a suitable power signal to power itself. Power pack 35 further comprises an AC power relay 660 which relays incoming AC power from power source 600 to the existing wired luminaire.

Power pack 35 furthers include an LED driver circuit 610. LED driver circuit 610 is coupled to luminaire and drives that luminaire by regulating a driving signal, in our example, a 0-10V dimming signal 620. The LED driver circuit 610 includes a driver circuit that provides power to a pilot LED 617 and a dimming signal to luminaire 620. LED driver circuit 610 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 610 is manufactured by EldoLED.

LED driver circuit 610 can further include an AC or DC current source or voltage source, a regulator, an amplifier (such as a linear amplifier or switching amplifier), a buck, boost, or buck/boost converter, or any other similar type of circuit or component. LED driver circuit 610 outputs a variable voltage or current as the dimming signal to luminaire(s) 620 that may include a DC offset, such that its average value is nonzero, and/or a AC voltage. The pilot LED 617 indicates the state of the power pack 35, for example, during the commissioning and maintenance process.

For purposes of communication and control, power pack 35 is treated as single addressable device that can be configured to operate as a member of one or more lighting control groups or zones. The power pack 35 is line powered and remains operational as long as power is available.

Power pack 35 includes power distribution circuitry 625 and a micro-control unit (MCU) 630. As shown, MCU 630 is coupled to LED driver circuit 610 and controls the light source operation of the luminaire via the dimming signal to luminaire 620. MCU 630 includes a memory 622 (volatile and non-volatile) and a central processing unit (CPU) 623. The memory 622 includes a lighting application 627 (which can be firmware) for both lighting control operations and commissioning/maintenance operations. The power distribution circuitry 625 distributes power and ground voltages to the LED driver circuit 610, MCU 630, and wireless transceivers 645 and 650 to provide reliable operation of the various circuitry on the power pack 35 chip.

Power pack 35 also includes a dual-band wireless radio communication interface system configured for two way wireless communication. In our example, power pack 35 has a radio set that includes radio 645 for sub-GHz communications and another radio 650 for Bluetooth RF communications. A first transceiver 645, such as a 900 MHz wireless transceiver, issues control operations on the lighting control network. This first transceiver 645 is for any-to-many (unicast and multicast) communication, over a first of the two different wireless communication bands, of control and systems operations information, during luminaire operation and during control network operation over the first wireless communication band.

A second transceiver 650, such as a 2.4 GHz BLE (Bluetooth) wireless transceiver carries out commissioning and maintenance of the lighting control network. This second transceiver 650 is for point-to-point communication, over a second of the two different wireless communication bands, of information other than the control and systems operations information, concurrently with at least some communications over the first wireless communication band.

As shown, the MCU 630 includes programming in the memory 622 which configures the CPU (processor) 623 to control operations of the respective power pack 35, including the communications over the two different wireless communication bands via the dual-band wireless radio communication interface system 645, 650. The programming in the memory 622 includes a real-time operating system (RTOS) and further includes a lighting application 627 which is firmware/software that engages in communications with the commissioning/maintenance application 22 of mobile device 25 over the commissioning network 7 of FIGS. 1A-B. The lighting application 627 programming in the memory 622 carries out lighting control operations over the lighting control network 5 of FIGS. 1A-B. The RTOS supports multiple concurrent processing threads for different simultaneous control or communication operations of the power pack 35.

Although not shown, it should be understood that the MCU 630 of power pack 35 may be of the three different CPU and memory architectures depicted and described for the luminaire 10 in FIGS. 3A-C and the wall switch 20 in FIGS. 4A-C. As explained earlier, integrating the first transceiver 645 and second transceiver 650, for example, into a dual band SOC chipset of the MCU 630, saves manufacturing costs and conserves power (e.g., line power or battery power).

Power pack 35 may include detector(s), such as a daylight sensor, an occupancy sensor, an audio sensor, a temperature sensor, or other environmental sensor (not shown). Detector(s) may be based on Acuity Brands Lighting's commercially available xPoint® Wireless ES7 product. Drive/sense circuitry (not shown), such as application firmware, can drive the occupancy and photo sensor hardware.

Figure 7:
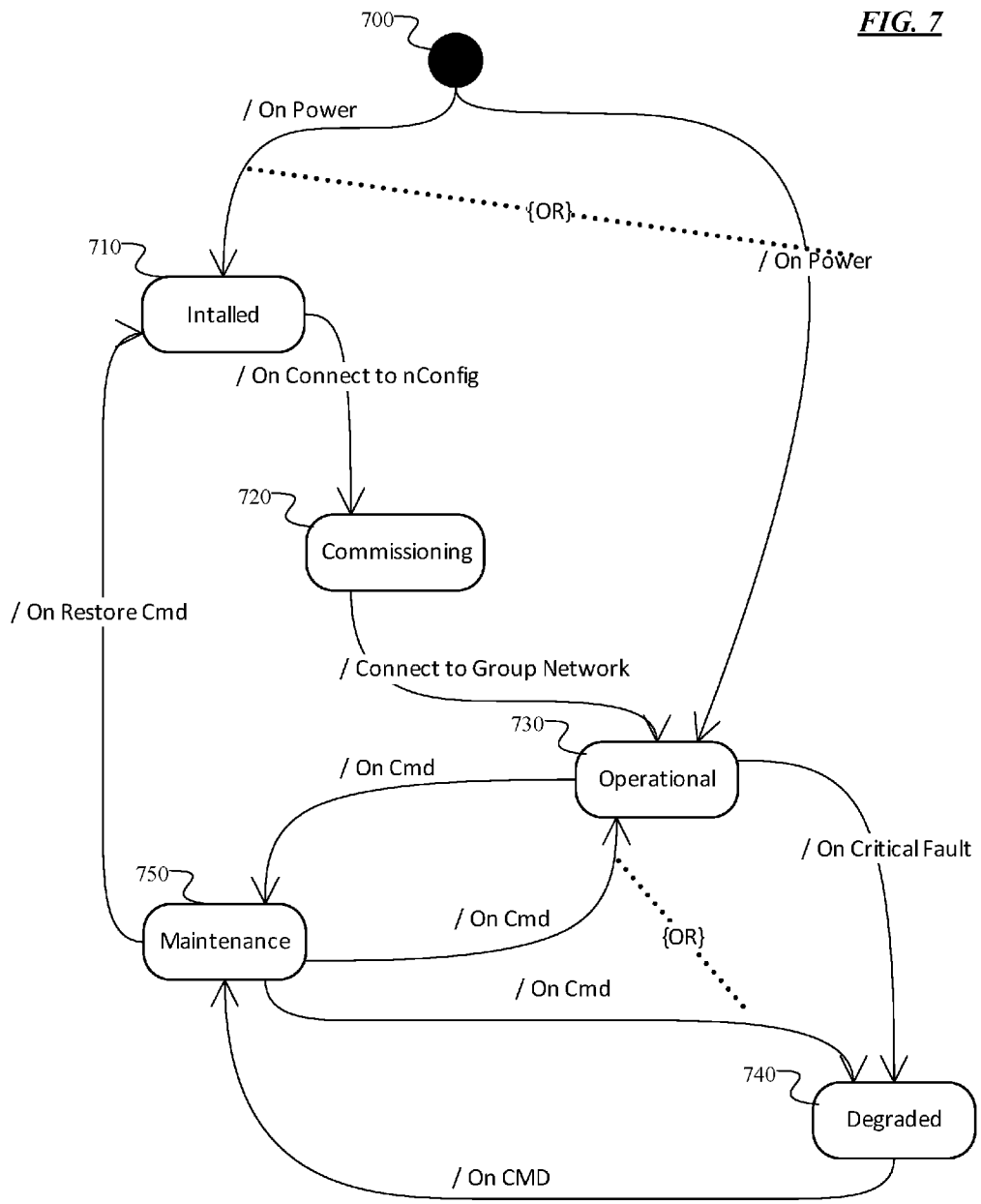
FIG. 7 is a flow chart presenting the states and transitions for the various lighting control devices of FIGS. 1A-B.

FIG. 7 is a flow chart presenting the states and transitions for the various lighting control devices of FIGS. 1A-B. As shown in FIG. 7, the various lighting control devices (luminaires 10A-N, wall switches 20A-N, plug load controller 30, and power pack 35) go through a series of states and transitions during commissioning of the lighting control system, when lighting control operations are executed, and during maintenance.

Beginning in block 700, lighting control devices are not yet powered up or installed. Moving now to block 710, upon power up after installation the lighting control devices behave as autonomous devices. There is no sub-GHz sub-network to provide collaborative control, however the lighting control devices begin BLE beaconing to identify themselves to a commissioning/maintenance application 22 executing on a mobile device 25.

Upon power up, luminaries 10A-N enter an autonomous control mode that permits the integrated detector(s) (e.g., occupancy, daylight/photo, or audio sensors) to exert limited control (lights on/off, dim up/down) of the light fixture. The control behavior is defined as default settings for the device.

After power up, wall switches 20A-N may turn off their beacons after a predetermined time period (e.g., one hour) after powering up in order to conserve battery life. While in an installed state, the wall switches 20A-N can be induced to restart their beacons by pushing any button offered. For example, the wall switches 20A-N switch off their beacons after a predetermined time period (e.g., one hour) after a button push.

On board pilot LEDs of the luminaires 10A-N, wall switches 20A-N, and other lighting control devices visually signal the state of the lighting control device (for all states) as an aid to the system installer and maintainer that is operating the commissioning/maintenance application 22 on the mobile device 25. The pilot LED goes off when the lighting control device is in an installed state.

Continuing now to block 720, the luminaires 10A-N, wall switches 20A-N, and other lighting control devices enter a commissioning state from the installed state upon connection to the commissioning/maintenance application 22 of the mobile device 25. The luminaires 10A-N, wall switches 20A-N, and other lighting control devices receive configuration information via the commissioning/maintenance application 22 and will transition to an operational state upon completing the commissioning process and connecting to the group subnetwork.

The advertising beacon signals a sub-state while the luminaires 10A-N and wall switches 20A-N undergo commissioning. The luminaires 10A-N, wall switches 20A-N, and other lighting control devices advertise an un-configured sub-state until completion of MAC-PHY configuration. Afterwards and until operational, the wall switches 20A-N or luminaires 10A-N advertise a waiting-connect (sub-GHz net) sub-state. Each of the luminaires 10A-N, wall switches 20A-N, and other lighting control devices is commanded to issue a blink during its commissioning phase, otherwise the LED is off.

Proceeding now to block 730, the luminaires 10A-N, wall switches 20A-N, and other lighting control devices participate in collaborative group and zone lighting control while in an operational state. For example, sensors 365 of luminaires 10A-N, wall switches 20A-N, and other lighting control devices affect zone behavior by signaling control measures to the lighting elements in the zone's fixtures.

As a security measure all luminaires 10A-N, wall switches 20A-N, and other lighting control devices, with the exception of the group monitor, cease BLE beaconing during the operational state. The group monitor changes its advertisement to indicate its role as the group monitor and its state (operational). The pilot LED remains off during the operational state.

Continuing now to block 740, depending on condition, luminaires 10A-N, wall switches 20A-N, and other lighting control devices experiencing faults may enter a degraded state where partial capability is available. It may be possible to correct a degraded state through the commissioning/maintenance application 22 of the mobile device 25. In this case, the degraded luminaires 10A-N, wall switches 20A-N, and other lighting control devices are commanded to switch to the maintenance state, the commissioning/maintenance application 22 of the mobile device 25 is connected, a fix is attempted, and the device transitions to either operational state or back to degraded state depending on outcome of fix. Pilot LEDs can issue a bright S-O-S indication of three rapid blinks, three off counts, and three rapid blinks while in degraded state. Upon button push, wall switches issue the same S-O-S type of signal 5 times and then cease activity to conserve battery power.

Moving now to block 750, luminaires 10A-N, wall switches 20A-N, and other lighting control devices can be commanded to enter a maintenance state. The command arrives over the lighting control network (sub-GHz network) from the group monitor. The luminaires 10A-N, wall switches 20A-N, and other lighting control devices maintain full or degraded operating capability while in the maintenance state. The luminaires 10A-N, wall switches 20A-N, and other lighting control devices resume BLE advertising (state=maintenance) seeking connection with commissioning/maintenance application 22 of the mobile device 25. Luminaires 10A-N, wall switches 20A-N, and other lighting control devices can then be re-configured via the commissioning/maintenance application 22 of the mobile device 25. The luminaires 10A-N, wall switches 20A-N, and other lighting control devices transition to an operational (or degraded) state upon command to exit the maintenance state. The pilot LED executes a continuous bright blink when in the maintenance state. Upon button push, wall switches 20A-N issue the same continuous bright blink type of signal 5 times and then cease LED activity to conserve battery power.

Figure 8:
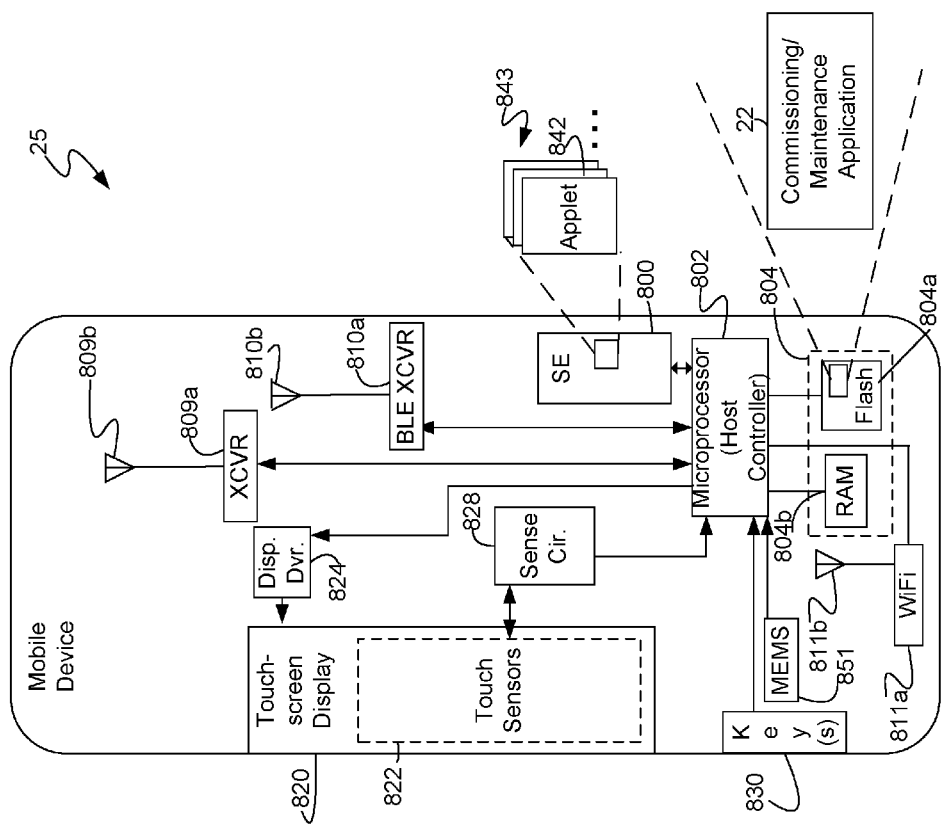
FIG. 8 is a high-level functional block diagram of a mobile device for commissioning and maintenance of the lighting control system of FIGS. 1A-B.

FIG. 8 is a high-level functional block diagram of a mobile device 25 for commissioning and maintenance of the lighting control system of FIGS. 1A-B. Shown are elements of a touch screen type of mobile device 25 having the commissioning/maintenance application 22 loaded, although other non-touch type mobile devices can be used in the prior token-based communications under consideration here. Examples of touch screen type mobile devices that may be used include (but are not limited to) a smart phone, a personal digital assistant (PDA), a tablet computer or other portable device. However, the structure and operation of the touch screen type devices 25 is provided by way of example; and the subject technology as described herein is not intended to be limited thereto. For purposes of this discussion, FIG. 8 therefore provides a block diagram illustration of the example of mobile device 25 having a touch screen display for displaying content and receiving user input as (or as part of) the user interface.

The activities that are the focus of discussions here typically involve data communications. As shown in FIG. 8, the mobile device 25 includes a first digital transceiver (XCVR) 809a, for digital wireless communications via a wide area wireless mobile communication network and second digital XCVR 810a for digital wireless communications via a Bluetooth network, although the mobile device 25 may include additional digital or analog transceivers (not shown).

The transceiver 810a (network communication interface) conforms to one or more of the various digital wireless communication standards for Bluetooth communications. As discussed previously, communications through the Bluetooth transceiver 810a and the commissioning network 7 shown in FIGS. 1A-B relate to protocols and procedures in support of commissioning and maintaining lighting control devices, including luminaires 10A-N, wall switches 20A-N, plug load controller 30, and power pack 35. In addition, communications to gateway 50 are also supported. Such communications, for example, may utilize IP packet data transport utilizing the digital wireless transceiver (XCVR) 810a and over the air communications via commissioning network 7 shown in FIGS. 1A-B. Transceiver 810a connects through radio frequency (RF) send-and-receive amplifiers (not shown) to an antenna 810b.

The transceiver 809a (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 809a provides two-way wireless communication of information including digitized audio signals, still image and/or video signals, web page information for display as well as web related inputs, and various types of mobile message communications to/from the mobile device 25.

In one example, the transceiver 809a sends and receives a variety of signaling messages in support of various data services provided by a network of a wireless service provider, to user(s) of mobile device 25 via a mobile communication network (not shown). Transceiver 809a also connects through radio frequency (RF) send-and-receive amplifiers (not shown) to an antenna 809b.

Many modern mobile device(s) 25 also support wireless local area network communications over WiFi, instead of or in addition to data communications using the wide area mobile communication network. Hence, in the example of FIG. 8, for packet data communications, mobile device 25 may also include a WiFi transceiver 811a and associated antenna 811b. Although WiFi is used here as the example, the transceiver 811a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 811a, for example, may provide two-way data transport for wireless communication with a wireless access point in a residence or enterprise that the user frequents or with any available hotspot offered in a public venue. A WiFi access point (not shown), communicates with compatible user equipment, such as the mobile device 25, over the air using the applicable WiFi protocol. The WiFi access point provides network connectivity, usually to a wide area network 55 (as shown in FIGS. 1A-B), such as the Internet. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 811a supports various types of data communications similar to the packet data communications supported via the mobile network transceiver 809a, including communications to and from gateway 50 and the other devices shown in FIGS. 1A-B.

The mobile device 25 further includes a microprocessor, sometimes referred to herein as the host controller 802. A processor 802 is a circuit having elements structured and arranged to perform one or more processing functions, typically various data processing functions. Although discrete logic components could be used, the examples utilize components forming a programmable CPU. A microprocessor 802 for example includes one or more integrated circuit (IC) chips incorporating the electronic elements to perform the functions of the CPU. The processor 802, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in mobile device 25, other devices and server computers (e.g., gateway 50), network elements, etc.

Returning more specifically to the mobile device 25 example of FIG. 8, the microprocessor 802 serves as a programmable host controller for mobile device 25 by configuring device 25 to perform various operations, for example, in accordance with instructions or programming executable by processor 802. For example, such operations may include various general operations of the mobile device 25, as well as operations related to communications with luminaires 10A-N, wall switches 20A-N and other lighting control devices during commissioning and maintenance performed by the commissioning/maintenance application 22. Although a processor may be configured by use of hardwired logic, typical processors in mobile devices are general processing circuits configured by execution of programming.

The mobile device 25 includes a memory or storage system 804, for storing data and programming. In the example, the memory system 804 may include a flash memory 804a and a random access memory (RAM) 804b. The RAM 804b serves as short term storage for instructions and data being handled by the processor 802, e.g. as a working data processing memory. The flash memory 804a typically provides longer term storage.

Hence, in the example of mobile device 25, the flash memory 804a is used to store programming or instructions for execution by the processor 802. Depending on the type of device, the mobile device 25 stores and runs a mobile operating system through which specific applications, including commissioning/maintenance application 22 (which may be a web browser executing a dynamic web page) or a native application, run on the mobile device 25. Examples of mobile operating systems include Google Android, Apple iOS (I-Phone or iPad devices), Windows Mobile, Amazon Fire OS, RIM BlackBerry operating system, or the like. Flash memory 804a may also be used to store mobile configuration settings for different mobile applications or services executable at device 25 using processor 802.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with communications for commissioning and maintenance on mobile device 25. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 804a, 804b of memory system 804, or a memory of a computer used to download or otherwise install such programming into the mobile device, or a transportable storage device or a communications medium for carrying program for installation in the mobile device 25.

In the example, the flash memory 804a stores applications for execution by the microprocessor-based host controller 802, typically through operation/execution of the device operating system. Of note, for purposes of the present discussion, the flash memory 804 stores a commissioning/maintenance application 22 as one of the programs for execution by the microprocessor 802. Execution of commissioning/maintenance application 22 by the microprocessor 802 configures mobile device 25 to perform a variety of functions, particularly to commission and maintain the lighting control devices over the commissioning network 7. In the example, commissioning/maintenance application 22 also engages in communications with the gateway 50.

In the illustrated example, the mobile device 25 includes a secure component 800. The secure component 800 (e.g. a secure element or "SE") may be provisioned as a section within the memory 804 or may take the form of a universal integrated circuit card (UICC) located within the device 25. A common example of a UICC implementation of the SE 800 is a subscriber identity module (SIM). As discussed above, the SE provides secure storage for various identifiers associated with mobile device 25. The SE typically has a unique identifier and is provisioned for operation of the mobile device 25 by storage of a mobile directory number (MDN) and/or mobile identification number (MIN) assigned to the device 25 by the carrier network operator.

The secure component contains applications that use secure keys running inside the secure processor. Although similar to other applications, the applications for the secure processor are sometimes smaller and sometimes referred to as applets 843. In an example, commissioning/maintenance application 22 may be an applet residing in the SE 800. For example, there may be at least one applet 842 to engage in communications.

The mobile device 25 may include a variety of different types of physical user interface elements to interact with the commissioning/maintenance application 22. For discussion purposes, in the mobile device 25 shown in FIG. 8, the physical user interface elements of device 20 includes a touch screen display 820 (also referred to herein as "touch screen 820" or "display 820") to support gestures. For output purposes, the touch screen 820 includes a display screen, such as a liquid crystal display (LCD) or the like. For input purposes, touch screen display 820 includes a plurality of touch sensors 822.

A keypad may be implemented in hardware as a physical keyboard of mobile device 25, and keys may correspond to hardware keys of such a keyboard. Alternatively, some or all of the keys 830 (and keyboard) of device 25 may be implemented as "soft keys" of a virtual keyboard graphically represented in an appropriate arrangement via touch screen display 820. The soft keys presented on the touch screen display 820 may allow the user of device 25 to invoke the same user interface functions as with the physical hardware keys for authentication purposes.

In general, touch screen display 820 and touch sensors 822 (and one or more keys 630, if included) are used to provide a textual and graphical user interface for the mobile device 25. In an example, touch screen display 820 provides viewable content to the user at device 25. Touch screen display 820 also enables the user to interact directly with the viewable content provided in the content display area, typically by touching the surface of the screen with a finger or an implement such as a stylus.

As shown in FIG. 8, the mobile device 25 also includes a sense circuit 828 coupled to touch sensors 822 for detecting the occurrence and relative location/position of each touch with respect to a content display area of touch screen display 820. In this example, sense circuit 828 is configured to provide processor 802 with touch-position information based on user input received via touch sensors 822. In some implementations, processor 802 is configured to correlate the touch position information to specific content being displayed within the content display area on touch screen display 820. The touch-position information captured by the sense circuit 828 and provided to processor 802 may include, but is not limited to, coordinates identifying the location of each detected touch with respect to the display area of touch screen display 820 and a timestamp corresponding to each detected touch position. Accordingly, the processor 802 may determine input of a phone number, a token, or menu identifiers selected during audible scripts, for example.

Various packet formats are shown in FIGS. 9A-C. In FIG. 9A, a media access control (MAC) layer message for communicating a state change event to a lighting control device on a lighting control network is shown. As shown, a MAC layer message 900 includes the following fields: option(s) 905, a source identifier 910, an RSSI/tag 915, a length of message 920, and a protocol data unit (PDU) or payload. In an example, the protocol for communicating the state change event is the AT command-response protocol defined in the SiLabs SPP-Over-BLE Application Note, 15, Nov. 2013, version 1.0, section 7. Options 905 may include a namespace field that has a command identifier. Source 910 identifies the lighting control device that has detected the state change event, for example, the source is the short sub-GHz MAC address of the detecting lighting control device. Length 920 specifies the length of the message, for example, number of bytes of the whole message (header plus payload plus checksum). Payload 925 is device specific and the form of the payload 925 is interpreted and managed by the lighting application 327. The MAC layer message 900 may further include a destination address (not shown) which is the sub-GHz short MAC address of the destination lighting control device (e.g., group/zone monitor).

FIG. 9B is a transport layer message for communicating a state change event to a lighting control device on a lighting control network. As shown, the transport layer message 930 includes the following fields: version 935, protocol 940, multicast identification 945, and lighting control group/zone identification 950. Version 935 specifies the firmware protocol version of the lighting application 327, for example. Protocol 940 specifies the lighting control network command communication protocol. Multicast identification 945 specifies the broadcast channel or an address of the lighting control group/zone. Lighting control group/zone 950 identifies the lighting control group or zone of the lighting control device that detected the state change event.

FIG. 9C is an application layer message for communicating a state change event to a lighting control device on a lighting control network. As shown, the application layer message 960 includes the broadcast channel or address of all of the lighting control group(s)/zone(s) that should receive the message. A lighting control group/zone monitor peaks into the application layer message 960 body and extracts the payload to pass the message to local and downstream lighting control devices.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A lighting control system comprising:
a lighting control group, including a monitor lighting control device, a member lighting control device, and a luminaire;
wherein the monitor lighting control device comprises:
a wireless radio communication interface system configured for wireless communication over a wireless lighting control network communication band, of control and systems operations information, during control network operation over the lighting control network communication band;
a processor;
a memory accessible to the processor; and
programming in the memory which configures the processor to:
receive via the wireless radio communication interface a state change event message that includes a payload specifying:
(i) a state change event of an occupancy sensor, an audio sensor, a daylight sensor, or a switch to turn lighting on/off, dim up/down, or set scene;
(ii) an identifier of the member lighting control device that detected the state change event; and
(iii) a lighting control group identifier of the lighting control group that includes the member lighting control device and the monitor lighting control device;

in response to receiving the state change event message, transmit via the wireless radio communication interface an acknowledgment of receipt of the state change event message to the member lighting control device;

extract and save the payload from the state change event message and generate a state change multicast message that includes the state change event of the extracted payload; and transmit via the wireless radio communication interface the generated state change multicast message to members of the lighting control group.

2. The lighting control system of claim 1, wherein the programming in the memory of the monitor lighting control device further configures the processor to:

transmit the generated state change multicast message to the lighting control group at least two times.

3. The lighting control system of claim 1, wherein the programming in the memory of the monitor lighting control device further configures the processor to:

look up identification for a set of lighting control devices that are members of the lighting control group in a lighting control group network table;

generate a check message for the identified set of lighting control devices to confirm receipt of the generated state change multicast message; and unicast the generated check message to each of the identified set of lighting control devices.

4. The lighting control system of claim 3, wherein the generated check message is unicasted to each of the identified set of lighting control devices in order as specified in the lighting control group network table.

5. The lighting control system of claim 3, wherein the programming in the memory of the monitor lighting control device further configures the processor to:

in response to unicasting the generated check message, receive an acknowledgement message from each of the identified set of lighting control devices indicating success or failure to execute illumination operation based on the state change event.

6. The lighting control system of claim 3, wherein the programming in the memory of the monitor lighting control device further configures the processor to:

receive a new state change event message from the member lighting control device that includes a new state change event that renders the generated state change multicast message obsolete;

upon receiving the new state change event message that renders the generated state change multicast message obsolete, terminate the unicast of the generated check message to each of the identified set of lighting control devices; and in response to receiving the new state change event message, acknowledge receipt of the new state change event message from the member lighting control device and generate a new state change multicast message based on the new state change event.

7. The lighting control system of claim 1, wherein the programming in the memory of the monitor lighting control device further configures the processor to:

determine if the lighting control group identified in the state change event message already has an in-progress state change; and upon determining the lighting control group identified in the state change event message already has the in-progress state change, cancel the in-progress activity and execute the state change.

8. The lighting control system of claim 1, wherein the member lighting control device comprises:

a wireless radio communication interface system configured for wireless communication over the wireless lighting control network communication band, of control and systems operations information, during illumination operation of one or more luminaires and during control network operation over the lighting control network communication band;

drive/sense circuitry to detect a state change of an occupancy sensor, an audio sensor, a daylight sensor, or a switch to turn lighting on/off, dim up/down, or set scene;

a processor coupled to the drive/sense circuitry;

a memory accessible to the processor; and programming in the memory which configures the processor to:

detect the state change of the occupancy sensor, the audio sensor, the daylight sensor, or the switch via the drive/sense circuitry;

in response to the detected state change event, generate a state change event message having a payload specifying the member lighting control device, the state change event, and the lighting control group identifier of the lighting control group that includes the member lighting control device;

unicast via the wireless radio communication interface the generated state change event message to the monitor lighting control device of the lighting control group; and upon failing to receive an acknowledgement of the unicasted state change event message from the monitor lighting control device within a predetermined time period, generate and multicast via the wireless radio communication interface the state change event message indicating the state change event to members of the lighting control group listening on a respective broadcast channel or an address of the lighting control group.

9. The lighting control system of claim 8, wherein the programming in the memory of the member lighting control device further configures the processor to:

upon failing to receive the acknowledgement of the unicasted state change event message from the monitor lighting control device within the predetermined time period, tally the failure to receive the acknowledgement of the unicasted state change event message from the monitor lighting control device as a communication fault.

10. The lighting control system of claim 8, wherein the programming in the memory of the member lighting control device further configures the processor to:

upon failing to receive the acknowledgement of the unicasted state change event message from the monitor lighting control device, drive the wireless radio communication interface system to full power prior to multicasting the state change event message to the members of the lighting control group listening on the respective broadcast channel or the address of the lighting control group.

11. The lighting control system of claim 8, wherein the programming in the memory of the member lighting control device further configures the processor to:

after multicasting the state change event message to the members of the lighting control group, initiate a re-survey of radio frequency (RF) connectivity with the monitor lighting control device.

12. The lighting control system of claim 11, wherein the programming in the memory of the member lighting control device further configures the processor to:
receive a response to the multicast state change event message from the monitor lighting control device during the re-survey of RF connectivity; and
after receiving the response from the monitor lighting control device to the multicast state change event message from the monitor lighting control device during the re-survey of RF connectivity, complete processing of the state change event at the monitor lighting control device.

13. The lighting control system of claim 11, wherein the programming in the memory of the member lighting control device further configures the processor to:
receive the acknowledgment of the unicast state change event message from the monitor lighting control device after the predetermined time period;
in response to receiving the acknowledgment of the unicast state change event message from the monitor lighting control device after the predetermined time period, complete processing of the state change event at the monitor lighting control device.

14. The lighting control system of claim 11, wherein the programming in the memory of the member lighting control device further configures the processor to:
in response to not receiving a response from the monitor lighting control device to the multicast state change event message and the initiated re-survey of RF connectivity, unicast a fault message to a backup monitor lighting control device identified in a lighting control group network table stored in the memory of the lighting control device.

15. The lighting control system of claim 8, wherein the programming in the memory of the member lighting control device further configures the processor to:
in response to the detected state change event, generate a wireless gateway notification specifying the lighting control device, the state change event, and the lighting control group identifier of the lighting control group that includes the lighting control device; and
unicast the generated wireless gateway notification to a gateway computer.

16. The lighting control system of claim 8, wherein the member lighting control device detects the state change of the occupancy sensor, the audio sensor, the daylight sensor, or the switch via the drive/sense circuitry by:
checking a hardware state of the occupancy sensor, the audio sensor, the daylight sensor, or the switch at a regular polling period.

17. The lighting control system of claim 16, wherein the regular polling period is 1 second.

18. The lighting control system of claim 1, wherein the luminaire comprises:
a wireless radio communication interface system configured for wireless communication over the wireless lighting control network communication band, of control and systems operations information, during illumination operation of the luminaire and during control network operation over the lighting control network communication band;
a processor;
a light emitting diode (LED) light source;
an LED driver circuit to drive the LED light source;
a memory accessible to the processor; and
programming in the memory which configures the processor to:
receive via the wireless radio communication interface a multicast message from the monitor lighting control device having a payload specifying:
(i) a state change event of an occupancy sensor, an audio sensor, a daylight sensor, or a switch to turn lighting on/off, dim up/down, or set scene; and
(ii) the lighting control group identifier of the lighting control group;
receive via the wireless radio communication interface a unicast message from the monitor lighting control device to confirm receipt of the multicast message;
send an acknowledgement message of the unicast message via the wireless radio communication to the monitor lighting control device to confirm receipt of the multicast message;
check the lighting control group identifier to determine whether the luminaire is a member of the lighting control group specified in the multicast message; and
upon determining that the luminaire is a member of the lighting control group, adjust illumination light output of the LED light source via the LED driver circuit in accordance with the state change event.

19. The lighting control system of claim 18, wherein the programming in the memory of the luminaire further configures the processor to:
before adjusting illumination light output of the LED light source via the LED driver circuit in accordance with the state change event, determine that the luminaire has not already acted in accordance with the state change event specified in the multicast message.

20. The lighting control system of claim 18, wherein the acknowledgement message indicates success or failure to receive the multicast message and confirm integrity of the multicast message.

* * * * *